(12) United States Patent
Leitner et al.

(10) Patent No.: US 7,740,261 B2
(45) Date of Patent: Jun. 22, 2010

(54) TAILGATE ACCESS STEP

(75) Inventors: Horst Leitner, Laguna Beach, CA (US); Anthony Smith, Costa Mesa, CA (US)

(73) Assignee: 89908, Inc., Irvine, CA (US)

( * ) Notice: Subject to any disclaimer, the term of this patent is extended or adjusted under 35 U.S.C. 154(b) by 193 days.

(21) Appl. No.: 11/924,549

(22) Filed: Oct. 25, 2007

(65) Prior Publication Data

US 2008/0100024 A1 May 1, 2008

Related U.S. Application Data

(60) Provisional application No. 60/863,340, filed on Oct. 27, 2006, provisional application No. 60/855,438, filed on Oct. 31, 2006.

(51) Int. Cl.
*B60R 3/02* (2006.01)
(52) U.S. Cl. .................... 280/166; 280/163
(58) Field of Classification Search .......... 280/163, 280/164.1, 164.2, 165, 166, 169, 291, 288.4, 280/297, 304.3, 762, 175, 75, 770; 296/203.01, 296/1.07, 151, 62; 152/215, 127, 89, 88
See application file for complete search history.

(56) References Cited

U.S. PATENT DOCUMENTS

| | | | |
|---|---|---|---|
| 752,031 A | 2/1904 | Chadwick | |
| 955,658 A | 4/1910 | Mitchell et al. | |
| 1,250,604 A | 12/1917 | Lorenc | |
| 1,471,972 A | 10/1923 | Miller | |
| 2,122,040 A | 6/1938 | Machovec | |
| 2,125,085 A * | 7/1938 | Pool | 280/166 |
| 2,436,961 A | 3/1948 | Gabriel | |
| 2,487,921 A | 11/1949 | Culver | |
| 2,492,068 A | 12/1949 | Schofield et al. | |
| 2,566,401 A * | 9/1951 | Bustin | 182/89 |

(Continued)

FOREIGN PATENT DOCUMENTS

CA 2082177 5/1994

(Continued)

OTHER PUBLICATIONS

U.S. District Court, Central District of California, Complaint dated Mar. 25, 2008, Case #: SACV08-00323 CJC (RNBx).

(Continued)

*Primary Examiner*—Glenn Dayoan
*Assistant Examiner*—Brodie Follman
(74) *Attorney, Agent, or Firm*—Knobbe Martens Olson & Bear LLP

(57) ABSTRACT

A retractable vehicle step is attachable to a rear portion of a vehicle or truck. The vehicle step facilitates access to a cargo hold of the vehicle. Advantageously, the vehicle step provides clearance space relative to a tailgate of the vehicle by displacing a stepping member of the vehicle step in a generally lateral direction. The vehicle step desirably has a covered and protected biasing mechanism for transitioning between retracted and extended positions of the stepping member. Another advantage is that the vehicle step is readily attachable to the vehicle using already existing connection members, thereby generally eliminating or mitigating the need for customized retrofitting and avoiding undesirable installation cost and time.

48 Claims, 17 Drawing Sheets

U.S. PATENT DOCUMENTS

| | | | |
|---|---|---|---|
| 2,575,615 A | 11/1951 | Crump | |
| 2,669,613 A | 2/1954 | Despard | |
| 2,678,832 A | 5/1954 | Wright | |
| 2,764,422 A | 9/1956 | McDonald | |
| 2,925,876 A | 2/1960 | Wagner | |
| 3,039,562 A | 6/1962 | Wagner | |
| 3,095,216 A | 6/1963 | Browne et al. | |
| 3,172,499 A | 3/1965 | Stairs | |
| 3,329,443 A | 7/1967 | Lowder et al. | |
| 3,488,066 A * | 1/1970 | Hansen | 280/163 |
| 3,494,634 A | 2/1970 | De Paula | |
| 3,522,396 A | 7/1970 | Norden | |
| 3,528,574 A | 9/1970 | Denner et al. | |
| 3,572,754 A | 3/1971 | Fowler | |
| 3,762,742 A | 10/1973 | Bucklen | |
| 3,807,757 A | 4/1974 | Carpenter et al. | |
| 3,833,240 A | 9/1974 | Weiler | |
| 3,865,399 A | 2/1975 | Way | |
| 3,887,217 A | 6/1975 | Thomas | |
| 3,889,997 A | 6/1975 | Schoneck | |
| 3,891,261 A | 6/1975 | Finneman | |
| 3,957,284 A | 5/1976 | Wright | |
| 3,961,809 A | 6/1976 | Clugston | |
| 3,980,319 A * | 9/1976 | Kirkpatrick | 280/166 |
| 3,981,515 A | 9/1976 | Rosborough | |
| 4,020,920 A | 5/1977 | Abbott | |
| 4,068,542 A | 1/1978 | Brand et al. | |
| 4,073,502 A | 2/1978 | Frank et al. | |
| 4,106,790 A | 8/1978 | Weiler | |
| 4,110,673 A | 8/1978 | Nagy et al. | |
| 4,116,457 A | 9/1978 | Nerem | |
| 4,164,292 A | 8/1979 | Karkau | |
| 4,174,021 A | 11/1979 | Barlock | |
| 4,180,143 A | 12/1979 | Clugston | |
| 4,185,849 A | 1/1980 | Jaeger | |
| 4,188,889 A | 2/1980 | Favrel | |
| 4,231,583 A | 11/1980 | Learn | |
| 4,424,751 A | 1/1984 | Blochlinger | |
| 4,440,364 A | 4/1984 | Cone et al. | |
| 4,462,486 A | 7/1984 | Dignan | |
| 4,536,004 A | 8/1985 | Brynielsson et al. | |
| 4,542,805 A | 9/1985 | Hamlin et al. | |
| 4,570,962 A | 2/1986 | Chavira | |
| 4,623,160 A | 11/1986 | Trudell | |
| D287,001 S | 12/1986 | Jarvie et al. | |
| 4,679,810 A | 7/1987 | Kimball | |
| 4,720,116 A | 1/1988 | Williams et al. | |
| 4,733,752 A | 3/1988 | Sklar | |
| 4,909,700 A | 3/1990 | Fontecchio | |
| 4,982,974 A | 1/1991 | Guidry | |
| 5,005,667 A | 4/1991 | Anderson | |
| 5,005,850 A | 4/1991 | Baughman | |
| 5,039,119 A | 8/1991 | Baughman | |
| 5,085,450 A | 2/1992 | DeHart | |
| 5,137,294 A * | 8/1992 | Martin | 280/166 |
| 5,154,125 A | 10/1992 | Renner et al. | |
| 5,195,609 A | 3/1993 | Ham et al. | |
| 5,199,731 A | 4/1993 | Martin | |
| 5,228,707 A | 7/1993 | Yoder | |
| 5,228,761 A | 7/1993 | Huebschen et al. | |
| 5,238,300 A | 8/1993 | Slivon et al. | |
| 5,257,847 A | 11/1993 | Yonehara | |
| 5,284,349 A | 2/1994 | Bruns et al. | |
| 5,286,049 A | 2/1994 | Khan | |
| 5,342,073 A | 8/1994 | Poole | |
| 5,358,268 A | 10/1994 | Hawkins | |
| 5,375,864 A | 12/1994 | McDaniel | |
| 5,423,463 A | 6/1995 | Weeks | |
| 5,439,342 A | 8/1995 | Hall et al. | |
| 5,462,302 A | 10/1995 | Leitner | |
| 5,498,012 A | 3/1996 | McDaniel et al. | |
| 5,501,475 A | 3/1996 | Bundy | |
| 5,505,476 A | 4/1996 | Maccabee | |
| 5,513,866 A | 5/1996 | Sisson | |
| 5,538,100 A | 7/1996 | Hedley | |
| 5,538,265 A | 7/1996 | Chen et al. | |
| 5,538,269 A | 7/1996 | McDaniel | |
| 5,547,040 A | 8/1996 | Hanser et al. | |
| 5,584,493 A | 12/1996 | Demski et al. | |
| 5,601,300 A | 2/1997 | Fink et al. | |
| 5,727,840 A | 3/1998 | Ochiai et al. | |
| 5,779,208 A | 7/1998 | McGraw | |
| 5,842,709 A | 12/1998 | Maccabee | |
| 5,897,125 A | 4/1999 | Bundy | |
| 5,941,342 A | 8/1999 | Lee | |
| 5,957,237 A | 9/1999 | Tigner | |
| 6,042,052 A | 3/2000 | Smith | |
| 6,055,780 A | 5/2000 | Yamazaki | |
| 6,082,751 A | 7/2000 | Hanes et al. | |
| 6,149,172 A | 11/2000 | Pascoe et al. | |
| 6,168,176 B1 * | 1/2001 | Mueller | 280/163 |
| 6,179,312 B1 | 1/2001 | Paschke et al. | |
| 6,203,040 B1 | 3/2001 | Hutchins | |
| 6,213,486 B1 | 4/2001 | Kunz | |
| 6,264,222 B1 | 7/2001 | Johnston et al. | |
| 6,270,099 B1 | 8/2001 | Farkash | |
| 6,325,397 B1 | 12/2001 | Pascoe et al. | |
| 6,375,207 B1 | 4/2002 | Dean et al. | |
| 6,412,799 B1 | 7/2002 | Schrempf | |
| 6,422,342 B1 | 7/2002 | Armstrong et al. | |
| 6,425,572 B1 | 7/2002 | Lehr | |
| 6,435,534 B1 | 8/2002 | Stone | |
| 6,439,342 B1 | 8/2002 | Boykin | |
| 6,460,915 B1 | 10/2002 | Bedi et al. | |
| 6,513,821 B1 | 2/2003 | Heil | |
| 6,533,303 B1 | 3/2003 | Watson | |
| 6,641,158 B2 | 11/2003 | Leitner | |
| 6,659,484 B2 | 12/2003 | Knodle et al. | |
| 6,663,125 B1 | 12/2003 | Cheng | |
| 6,746,033 B1 | 6/2004 | McDaniel | |
| 6,830,257 B2 | 12/2004 | Leitner | |
| 6,834,875 B2 | 12/2004 | Leitner | |
| 6,918,624 B2 | 7/2005 | Miller et al. | |
| 6,926,295 B2 | 8/2005 | Berkebile et al. | |
| 6,938,909 B2 | 9/2005 | Leitner | |
| 6,942,233 B2 | 9/2005 | Leitner et al. | |
| 6,942,272 B2 | 9/2005 | Livingston | |
| 6,948,903 B2 | 9/2005 | Ablabutyan et al. | |
| 6,955,370 B2 | 10/2005 | Fabiano et al. | |
| 6,959,937 B2 | 11/2005 | Schneider et al. | |
| 6,966,597 B2 | 11/2005 | Tegtmeier | |
| 6,971,652 B2 | 12/2005 | Bobbert et al. | |
| 6,997,469 B2 | 2/2006 | Lanoue et al. | |
| 7,000,932 B2 | 2/2006 | Heil et al. | |
| 7,007,961 B2 | 3/2006 | Leitner | |
| 7,017,927 B2 | 3/2006 | Henderson et al. | |
| 7,055,839 B2 | 6/2006 | Leitner | |
| 7,070,194 B2 | 7/2006 | Garland et al. | |
| 7,090,276 B1 | 8/2006 | Bruford et al. | |
| 7,111,858 B2 | 9/2006 | Manser et al. | |
| 7,118,120 B2 | 10/2006 | Lee et al. | |
| 7,118,150 B2 | 10/2006 | Bruford et al. | |
| 7,163,221 B2 | 1/2007 | Leitner | |
| 7,219,911 B2 * | 5/2007 | Sukonthapanich et al. | 280/166 |
| 7,287,771 B2 | 10/2007 | Lee et al. | |
| 7,367,574 B2 | 5/2008 | Leitner | |
| 7,377,531 B2 * | 5/2008 | Fabiano et al. | 280/163 |
| 7,380,807 B2 | 6/2008 | Leitner | |
| 7,398,985 B2 | 7/2008 | Leitner | |
| 7,413,204 B2 | 8/2008 | Leitner | |
| 7,413,205 B2 | 8/2008 | Watson | |
| 7,441,790 B2 * | 10/2008 | Lechkun | 280/166 |
| 7,469,916 B2 * | 12/2008 | Watson | 280/166 |
| 7,513,520 B2 * | 4/2009 | Okuyama | 280/166 |

| | | |
|---|---|---|
| 2002/0109446 A1 | 8/2002 | Arnold |
| 2002/0130531 A1 | 9/2002 | Leitner |
| 2002/0153201 A1 | 10/2002 | Warford |
| 2003/0038446 A1* | 2/2003 | Anderson et al. ............ 280/166 |
| 2003/0090081 A1 | 5/2003 | Oakley |
| 2003/0094781 A1 | 5/2003 | Jaramillo et al. |
| 2003/0132595 A1 | 7/2003 | Fabiano |
| 2003/0184040 A1* | 10/2003 | Leitner et al. ................ 280/166 |
| 2004/0100063 A1 | 5/2004 | Henderson et al. |
| 2004/0108678 A1 | 6/2004 | Berkebile et al. |
| 2004/0135339 A1 | 7/2004 | Kim |
| 2004/0164580 A1 | 8/2004 | Armstrong et al. |
| 2004/0207224 A1 | 10/2004 | Miller et al. |
| 2005/0006870 A1 | 1/2005 | Williams |
| 2005/0035568 A1 | 2/2005 | Lee et al. |
| 2005/0104318 A1 | 5/2005 | Lee et al. |
| 2005/0167941 A1 | 8/2005 | Garland et al. |
| 2005/0258616 A1 | 11/2005 | Scheuring, III et al. |
| 2005/0280242 A1 | 12/2005 | Fabiano et al. |
| 2006/0082096 A1 | 4/2006 | Sukonthapanich et al. |
| 2006/0125204 A1 | 6/2006 | Leitner |
| 2006/0163836 A1* | 7/2006 | Kobayashi .................. 280/166 |
| 2006/0208449 A1 | 9/2006 | Kuo et al. |
| 2006/0214386 A1 | 9/2006 | Watson |
| 2007/0012498 A1 | 1/2007 | Schulz |
| 2008/0084045 A1* | 4/2008 | Filias et al. ................. 280/166 |
| 2008/0100025 A1 | 5/2008 | Leitner |
| 2009/0008894 A1* | 1/2009 | Kuntze et al. ............... 280/166 |

FOREIGN PATENT DOCUMENTS

| | | |
|---|---|---|
| CA | 2370618 | 11/2000 |
| CA | 2332193 | 9/2001 |
| DE | 31 51 621 A1 | 7/1983 |
| DE | 39 32 142 A1 | 4/1990 |
| DE | G 8919833.3 | 10/1990 |
| GB | 934387 | 8/1963 |
| GB | 2045699 | 11/1980 |
| GB | 212 9378 | 5/1984 |
| JP | 63255144 | 10/1988 |
| JP | 4339040 | 11/1992 |
| JP | 4339041 | 11/1992 |
| JP | 04342629 A | 11/1992 |
| JP | 05310081 A | 11/1993 |
| SU | 403594 | 10/1973 |
| WO | WO 03/039910 | 5/2003 |
| WO | WO 03/039920 C2 | 5/2003 |
| WO | WO 2006/050297 A2 | 5/2006 |

OTHER PUBLICATIONS

U.S. Appl. No. 12/143,619, filed Jun. 20, 2008, pending (022C5).
U.S. Appl. No. 12/143,559, filed Jun. 20, 2008, pending (035C3).
U.S. Appl. No. 12/511,027, filed Jul. 28, 2009, pending.

* cited by examiner

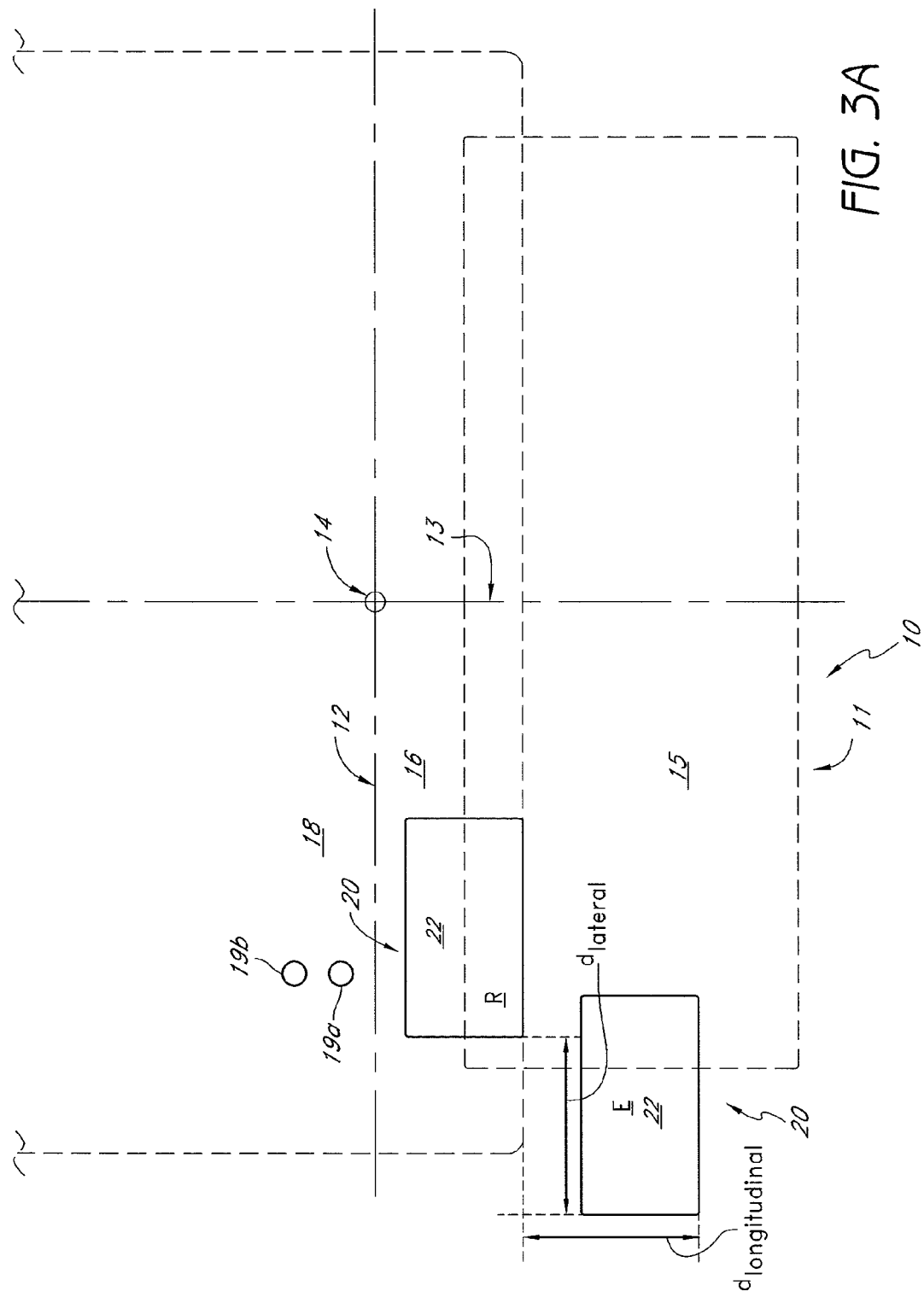

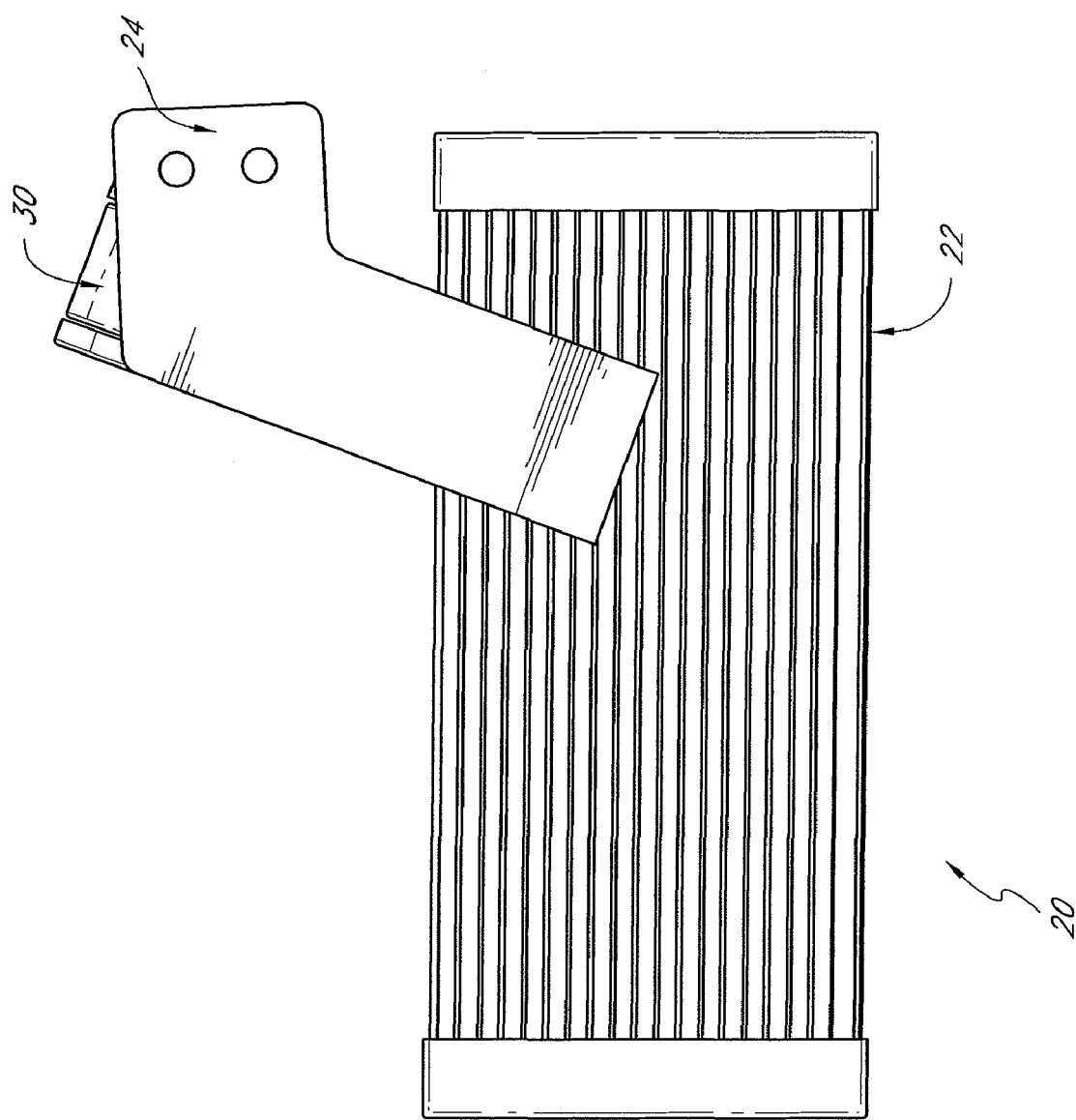

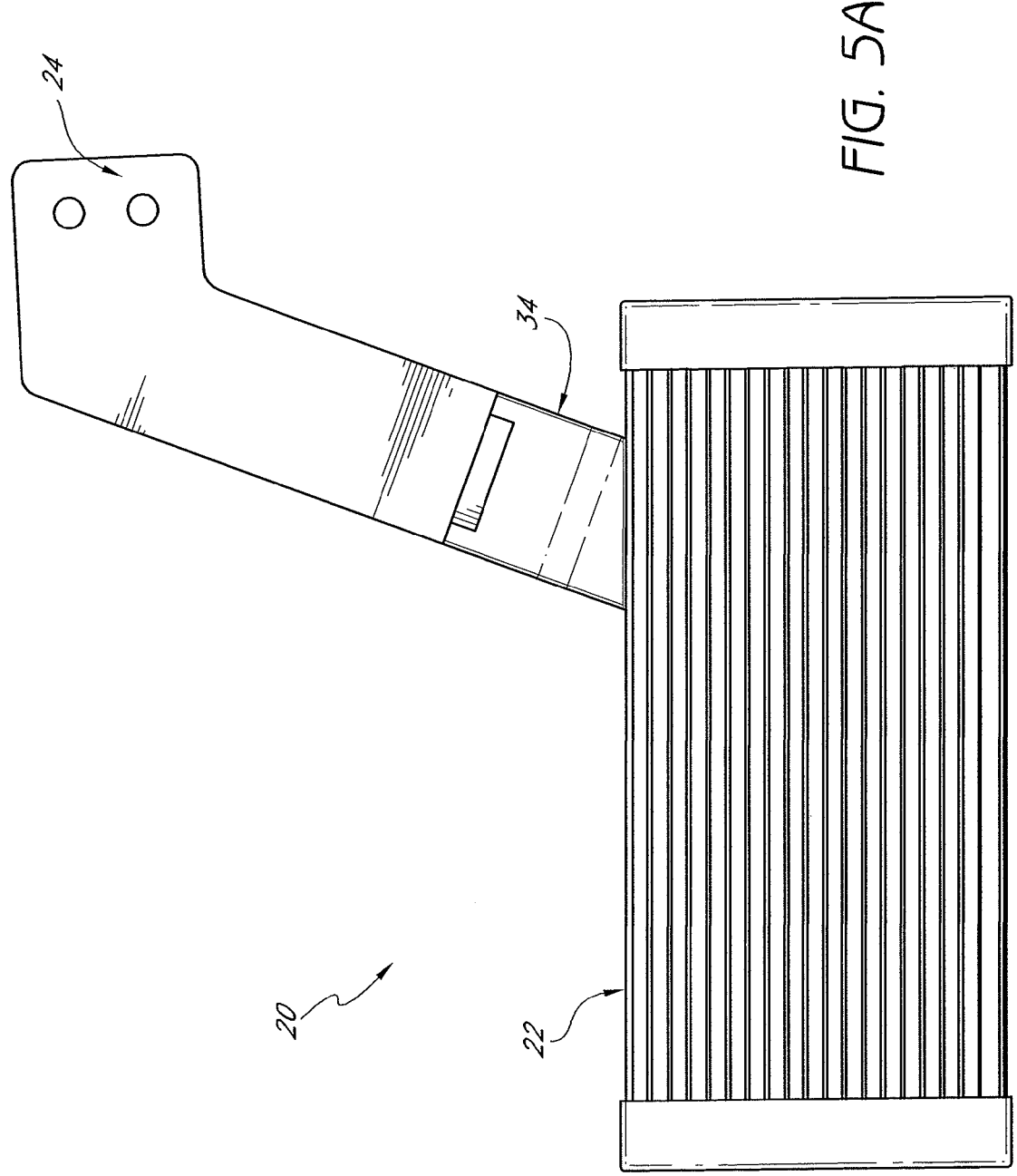

TAILGATE ACCESS STEP

PRIORITY CLAIM AND INCORPORATION BY REFERENCE

The present application claims the benefit of U.S. Provisional Patent Application Nos. 60/863,340, filed Oct. 27, 2006 (entitled "RETRACTABLE VEHICLE STEP WITH TAILGATE CLEARANCE") and 60/855,438, filed Oct. 31, 2006 (entitled "RETRACTABLE VEHICLE STEP WITH TAILGATE CLEARANCE").

The present application incorporates by reference the entire disclosures of U.S. Provisional Patent Application Nos. 60/863,340, filed Oct. 27, 2006 (entitled "RETRACTABLE VEHICLE STEP WITH TAILGATE CLEARANCE") and 60/855,438, filed Oct. 31, 2006 (entitled "RETRACTABLE VEHICLE STEP WITH TAILGATE CLEARANCE").

BACKGROUND OF THE INVENTION

1. Field of the Invention

The invention relates generally to a stepping assist for vehicles. In particular, certain embodiments of the invention relate to a retractable vehicle step which is moveable between a retracted or storage position and an extended position in which it functions as a step assist to facilitate access to a tailgate of a vehicle such as a truck. In some embodiments, the stepping assist allows access to a cargo bed while advantageously providing tailgate clearance.

2. Description of the Related Art

Many vehicles such as trucks provide a fixed position stepping assist to allow access to the cargo bed of the truck.

There are also retractable stepping assists which are meant to provide truck cargo bed access.

SUMMARY OF THE INVENTION

Certain embodiments of the invention provide a retractable vehicle step that is attachable to a rear portion of a vehicle or truck. The vehicle step facilitates access to a cargo hold of the vehicle. Advantageously, the vehicle step may provide clearance space relative to a tailgate of the vehicle by displacing a stepping member of the vehicle step in a generally lateral direction. The vehicle step desirably has a covered and protected biasing mechanism for transitioning between retracted and extended positions of the stepping member. Another advantage is that the vehicle step may be readily attachable to the vehicle using already existing connection members, thereby generally eliminating or mitigating the need for customized retrofitting and minimizing or avoiding undesirable installation cost and time.

Some embodiments provide a retractable vehicle step. The retractable vehicle step generally comprises a stepping member and a biasing mechanism. The stepping member is moveable between a retracted position and an extended position. The biasing mechanism is operably coupled to the stepping member. In some embodiments, the biasing member generally comprises a moveable retaining surface and a cam surface such that in the retracted position the cam surface contacts the retaining surface and urges the stepping member toward the retracted position. Advantageously, the stepping member is substantially laterally displaced by a predetermined distance when transitioning between the retracted position and the extended position. In some embodiments, the retractable vehicle step is manually operable by the foot or other appendage of a user.

For purposes of summarizing the invention, certain aspects, advantages and novel features of embodiments of the invention have been described herein above. Of course, it is to be understood that not necessarily all such advantages may be achieved in accordance with any particular embodiment of the invention. Thus, the invention may be embodied or carried out in a manner that achieves or optimizes one advantage or group of advantages as taught or suggested herein without necessarily achieving other advantages as may be taught or suggested herein. It is possible that even all of the specified advantages will not be present. Rather, the scope of the claims is not limited by these advantages unless expressly so stated.

All of these embodiments are intended to be within the scope of the invention herein disclosed. These and other embodiments of the invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and some of its features and advantages, certain preferred embodiments and modifications thereof will become apparent to those skilled in the art from the detailed description herein having reference to the figures that follow, of which:

FIG. 3A is a simplified schematic top view of a retractable vehicle step in both retracted and extended states showing its clearance features relative to a vehicle on which it is mounted illustrating features and advantages in accordance with some embodiments of the invention.

FIG. 4A is a top view of the retractable vehicle step of FIG. 4 in a retracted or storage state illustrating features and advantages in accordance with some embodiments of the invention.

FIG. 5A is a top view of the retractable vehicle step of FIG. 5 in an extended state illustrating features and advantages in accordance with some embodiments of the invention.

DETAILED DESCRIPTION OF THE PREFERRED EMBODIMENTS

The preferred embodiments of the invention described herein relate generally to a stepping assist for vehicles and, in particular, to a retractable vehicle step which is desirably moveable between a retracted or storage position and an extended position in which it functions as a step assist to facilitate access to a cargo bed of a vehicle such as a truck while advantageously providing tailgate clearance.

While the description sets forth various embodiment specific details, it will be appreciated that the description is illustrative only and should not be construed in any way as limiting the invention. Furthermore, various applications of the invention, and modifications thereto, which may occur to those who are skilled in the art, are also encompassed by the general concepts described herein.

Figure 1:
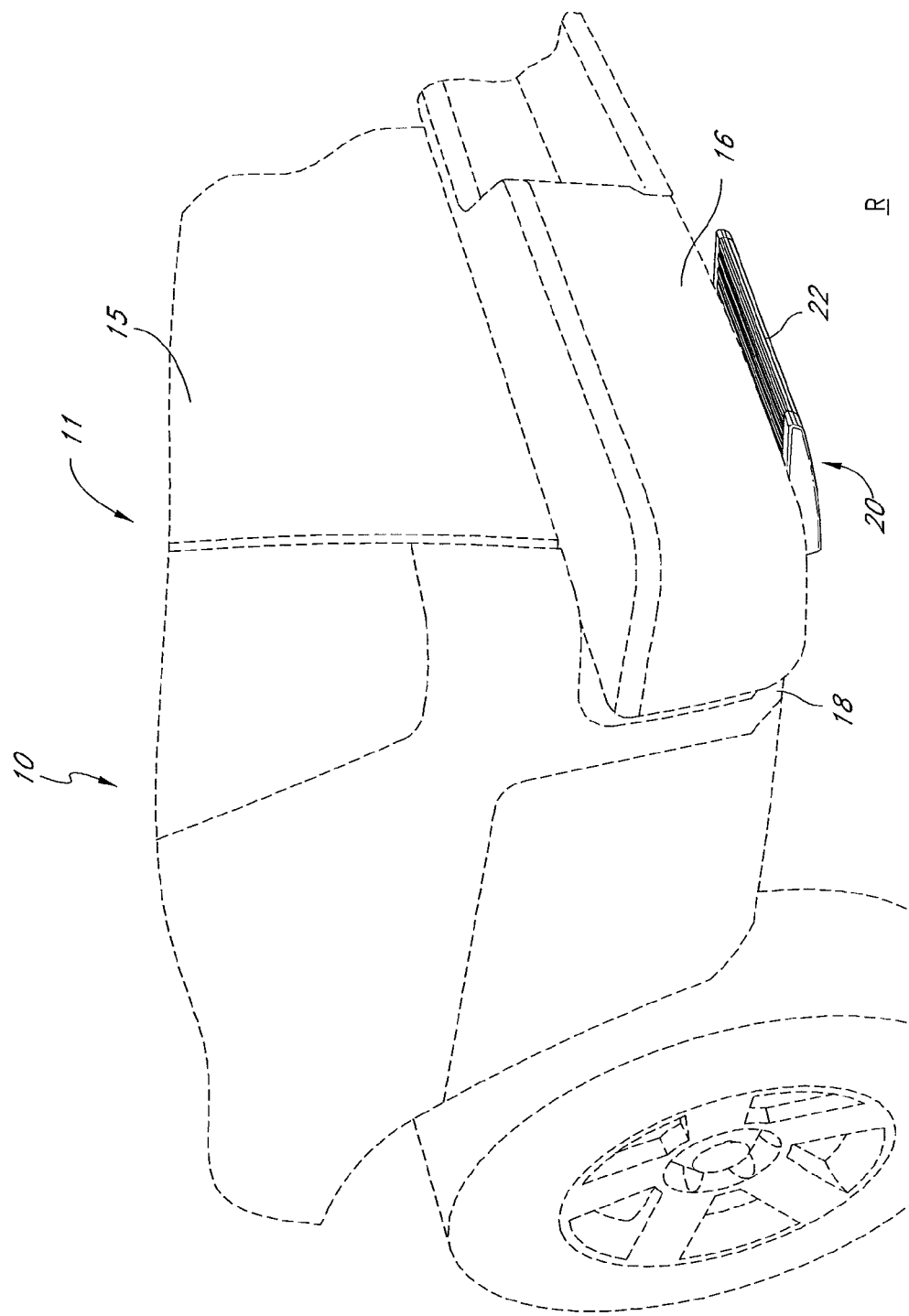
FIG. 1 is a simplified perspective view of a retractable vehicle step in a retracted or storage state mounted on a vehicle illustrating features and advantages in accordance with some embodiments of the invention.
Figure 2:
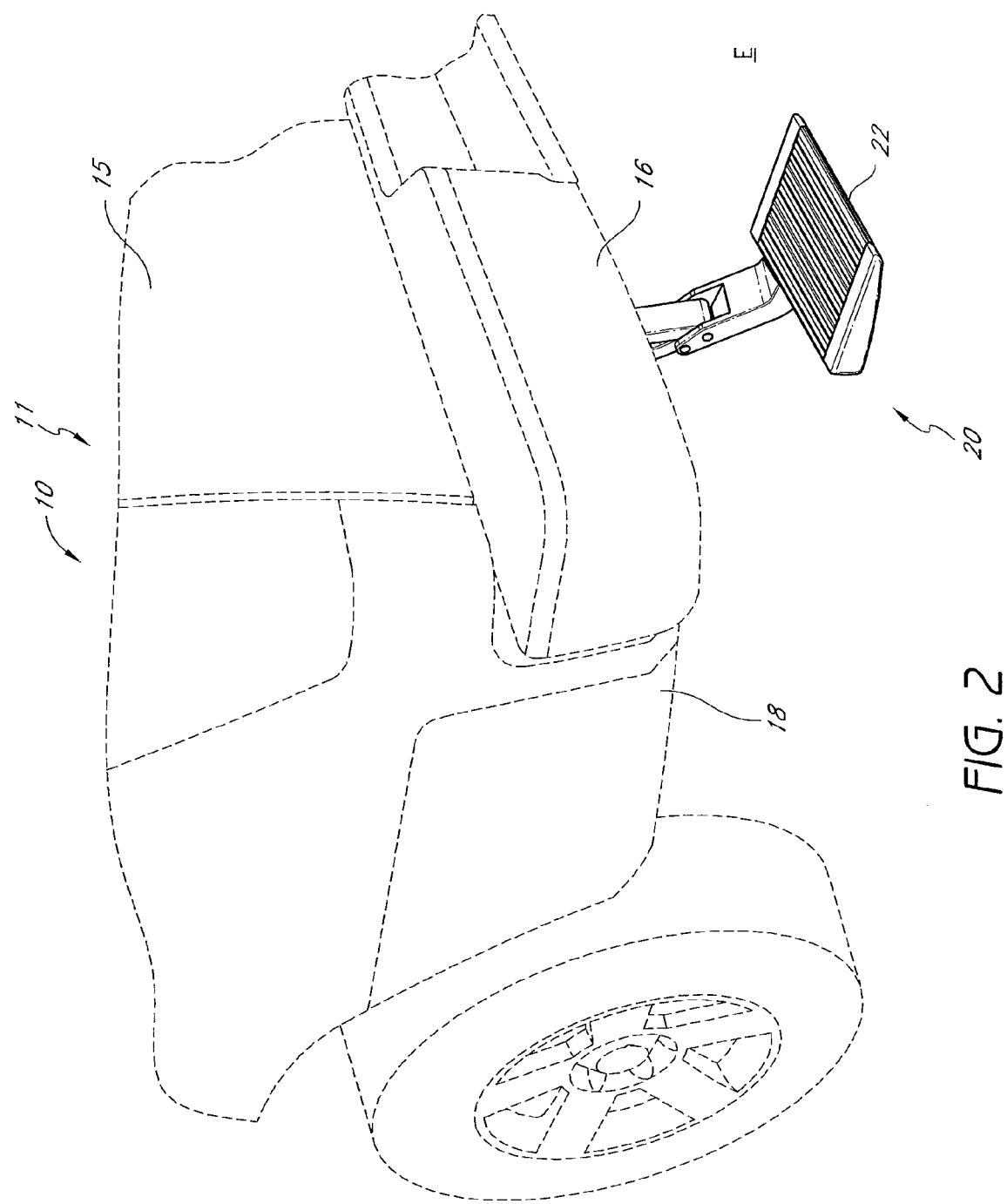
FIG. 2 is a simplified perspective view of the retractable vehicle step of FIG. 1 in an extended state mounted on a vehicle illustrating features and advantages in accordance with some embodiments of the invention.
Figure 3:
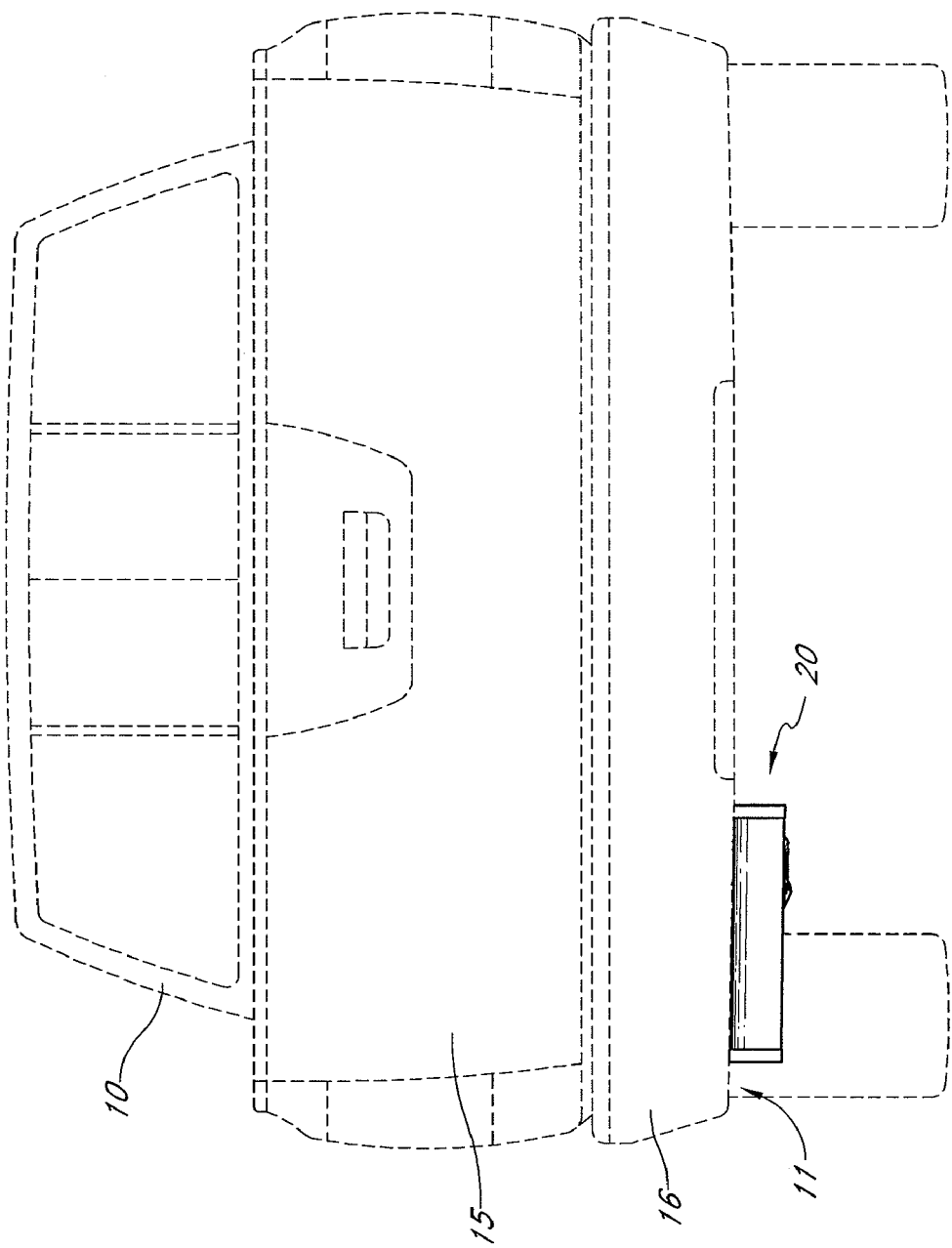
FIG. 3 is a simplified rear view of the retractable vehicle step of FIG. 2 in a retracted state mounted on a vehicle illustrating features and advantages in accordance with some embodiments of the invention.

FIGS. 1-3 show different views and positions of certain embodiments of a retractable vehicle step or tailgate step assembly 20 mounted on or attached to a vehicle or truck 10. As discussed further herein, one advantage of certain embodiments of the retractable vehicle step 20 is that it desirably provides tailgate clearance.

The vehicle 10 comprises a generally rear portion or end 11 at which location the retractable vehicle step 20 is positioned. For convenience and reference, the schematic drawing of FIG. 3A shows a top view of the vehicle 10 as having a lateral axis 12, a longitudinal or long axis 13 and a generally vertical axis 14. These axes can be considered to be respective X-, Y- and Z-axes of a three dimensional Cartesian coordinate system.

The vehicle rear portion 11 includes a tailgate 15 and a bumper 16. As discussed in more detail later herein, the retractable vehicle step 20 is attached to a rear underbody, chassis or frame 18 of the vehicle 10 using, in certain embodiments, already existing connection members (e.g., trailer hitch bolts 19a, 19b or the like) on the vehicle 10. The retractable vehicle step 20 comprises, among other components as discussed in further detail below, a stepping member 22.

FIG. 1 shows the retractable vehicle step 20 in a retracted or storage position or state generally denoted by "R." In the retracted position, the stepping member 22 is generally positioned below and within the projection of the horizontal perimeter of the bumper 16.

FIG. 2 shows the retractable vehicle step 20 in an extended or operational position or state generally denoted by "E." In transitioning from the retracted position to the extended position, the stepping member 22 exits the rear portion 11 of the vehicle 10 from below the bumper 16 and advantageously provides a stepping assist, with tailgate and/or bumper clearance, for a user to access the cargo bed of the vehicle 10. During this motion of the stepping member 22, in certain embodiments, it is displaced laterally, longitudinally and vertically.

FIG. 3 shows the retractable vehicle step 20 in a retracted position R. In some embodiments, in the retraced position R, the vehicle step 20 is generally positioned below the tailgate 15 of the vehicle 10.

Figure 3B:
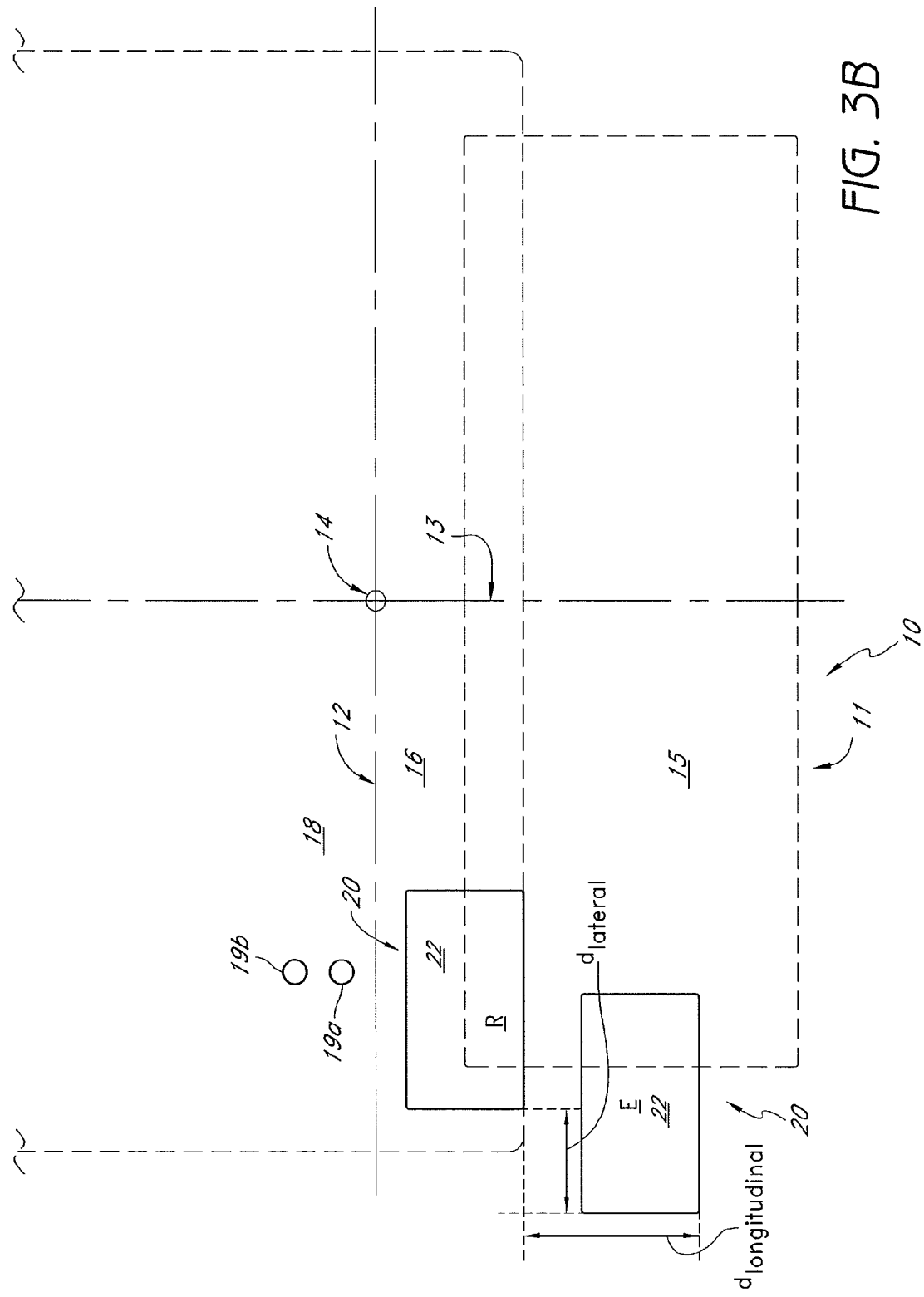
FIG. 3B is a simplified schematic top view of a retractable vehicle step in both retracted and extended states showing its clearance features relative to a vehicle on which it is mounted illustrating features and advantages in accordance with some embodiments of the invention.

FIG. 3A shows the lateral and longitudinal displacements of the stepping member 22 when transitioning between the retracted and extended positions as $d_{lateral}$ and $d_{longitudinal}$. Stated differently, the stepping member 22 extends in an angular manner from the retracted position to the extended position. In other words, the desirable and predetermined lateral displacement advantageously creates an increased effective step width which provides clearance from the tailgate 15 (and/or bumper 16) even when the tailgate 15 is in the open position (as shown schematically in FIG. 3) and allows convenient use. FIG. 3B also shows a stepping member 22 transitioning between the retracted and extended positions. In this illustrated embodiment, in the retracted position the outer edge of the stepping member 22 is positioned closer to the side of the vehicle 10. In this embodiment, the lateral movement $d_{lateral}$ of the stepping member 22 as it transitions between the retracted and extended positions is small than the lateral movement $d_{lateral}$ of the stepping member 22 shown in FIG. 3A that is positioned further towards the midline of the vehicle 10 when in the retracted position.

In some embodiments, the lateral displacement ($d_{lateral}$) is about 6.4 cm (2.5 inches). In another embodiment, the lateral displacement ($d_{lateral}$) is in the range from about 5.1 cm (2 inches) to about 7.6 cm (3 inches), including all values and sub-ranges therebetween. In yet another embodiment, the lateral displacement ($d_{lateral}$) is in the range from about 2.5 cm (1 inch) to about 12.7 cm (5 inches), including all values and sub-ranges therebetween. In another embodiment, the lateral displacement $d_{lateral}$ may be at least 2 inches, at least 2.5 inches, at least 3 inches, at least 3.5 inches, or at least 4 inches. In modified embodiments, the lateral displacement may efficaciously be more or less, as needed or desired.

Figure 4:
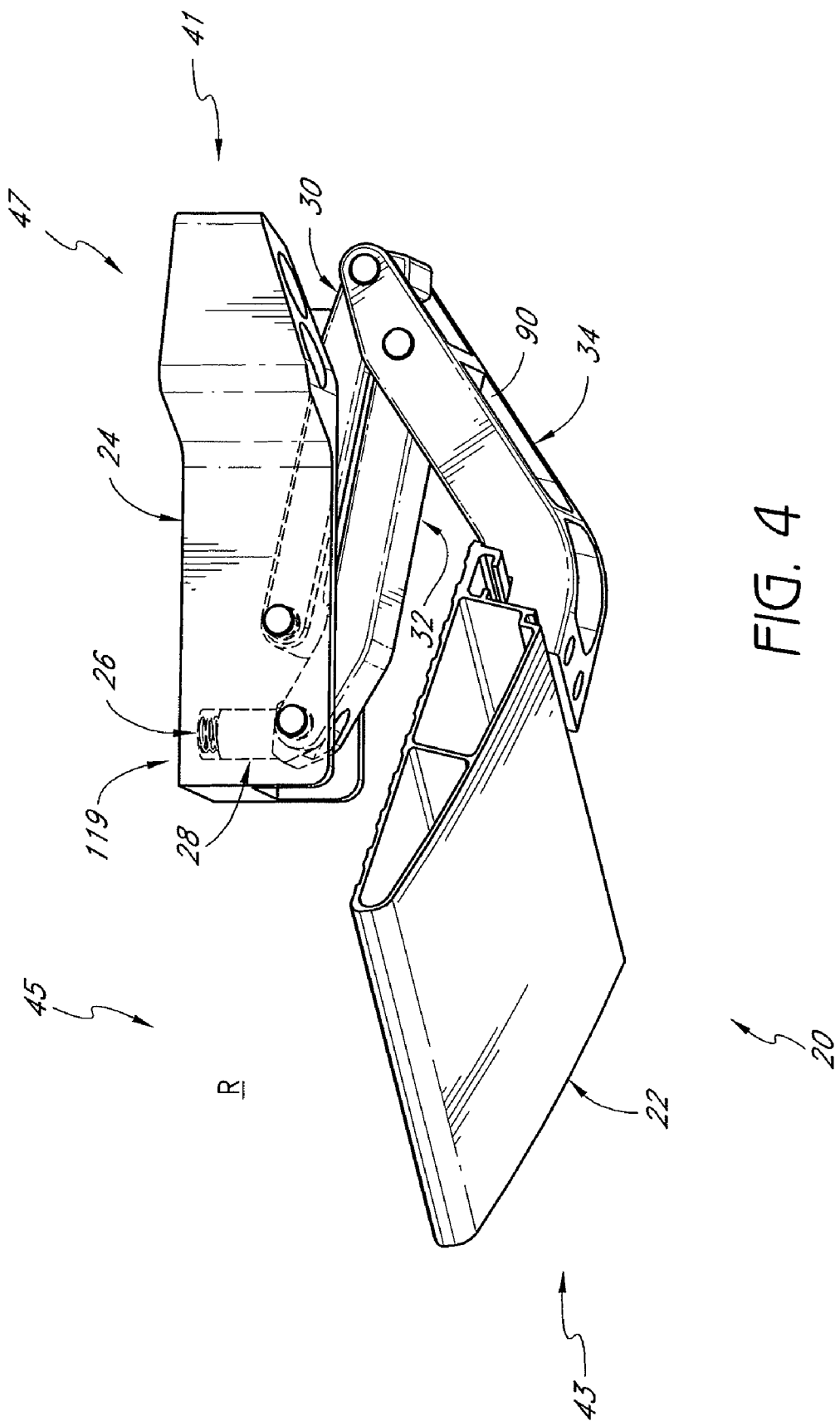
FIG. 4 is a simplified perspective of a retractable vehicle step in a retracted or storage state illustrating features and advantages in accordance with some embodiments of the invention.

As shown in FIG. 4, and discussed further below, in certain embodiments the retractable vehicle step 20 includes an upper end 41, a lower end 43, a front end 45, and a back end 47. The upper end 41 of the retractable vehicle step 20 may be configured to readily be attachable to the vehicle 10 using industry standard trailer hitch bolts 19a, 19b which are provided on virtually all trucks and the like by manufacturers. Advantageously, this permits the retractable vehicle step 20 of certain embodiments to be mountable to a vehicle using already existing connection members without the undesirable need for extra components or custom installation. However, in modified embodiments, the retractable vehicle step 20 may be constructed to permit custom installation, as needed or desired to various parts of the vehicle 10, for example the frame 18 or bumper 16. For example, a plurality of designs may be provided with each suitable for a particular vehicle type.

The retractable vehicle step 20, in certain embodiments, generally comprises a upper mount 24, a biasing member or spring 26, a moveable plunger or piston 28, a medial inner or first arm 30, a medial outer or second arm 32, a lower mount 34, and the stepping member 22 at a lower, front-most position. A plurality of clevis pins, pivot pins, screws or the like, as described further below, connect the various components of the retractable vehicle step to form an assembly.

In certain embodiments, the upper mount 24 is angular or generally L-shaped with a substantially hollow interior or channel which desirably provides for a light weight device while maintaining structural integrity. The upper mount 24 is desirably rigidly mountable to the vehicle 10 and comprises a back portion or end 36 which includes a pair of spaced through holes or passages 38a, 38b. In certain embodiments, the through holes or passages 38a, 38b are desirably configured and dimensioned to receive connection members or elements, such as the already existing respective vehicular trailer hitch bolts 19a, 19b (see FIG. 3A), to facilitate connection or attachment to the vehicle 10 without the undesirable need for extra components or custom installation. The through holes 38a, 38b can include two portions with different diameters to accommodate the bolts heads and their shanks, as needed or desired.

Figure 6:
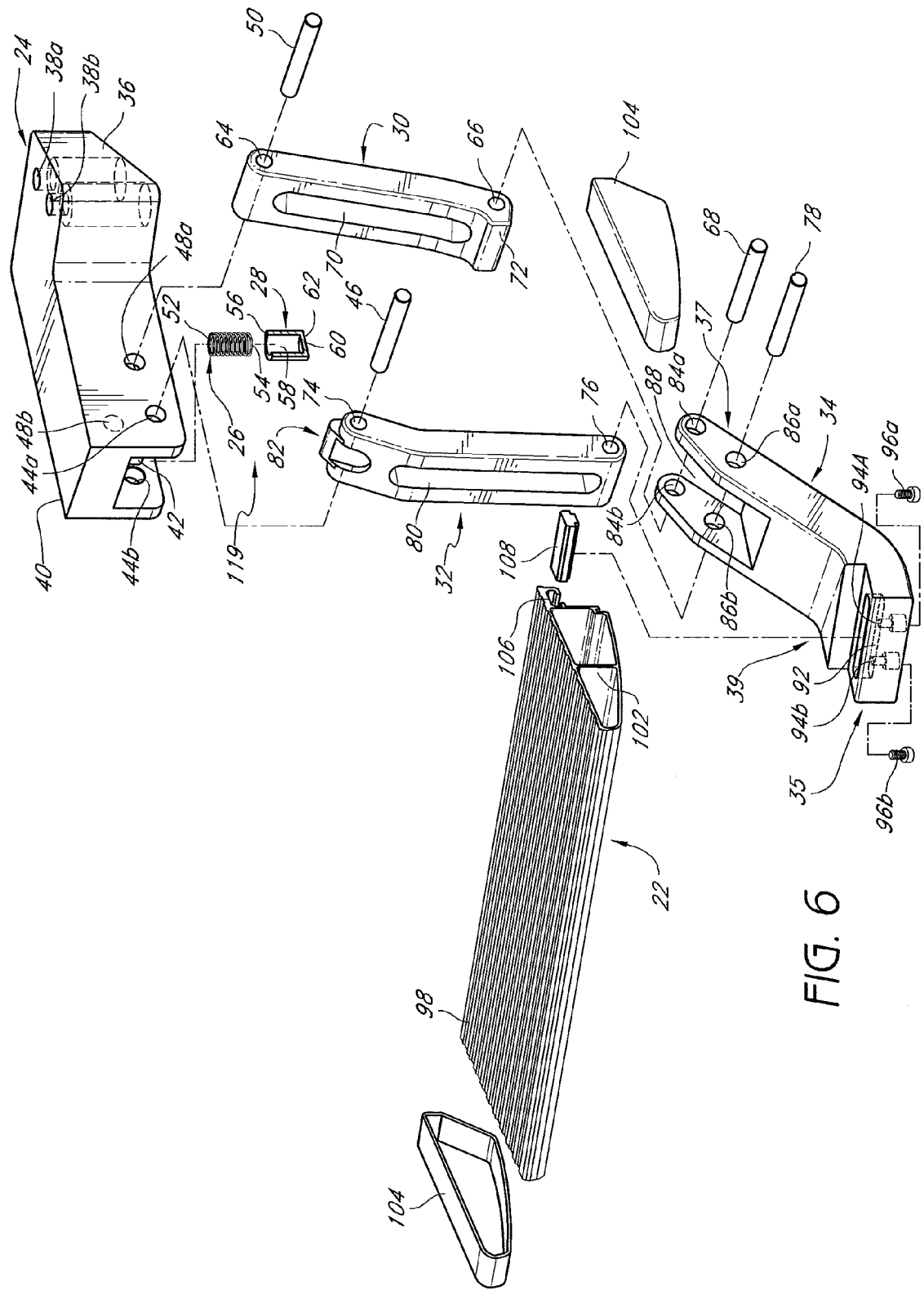
FIG. 6 is a simplified exploded perspective of the retractable vehicle step of FIG. 4 illustrating features and advantages in accordance with some embodiments of the invention.

Referring to FIG. 6, the upper mount 24 further comprises a front portion or end 40 which includes a socket or opening 42 that receives at least a portion of the spring 26 and plunger 28. The front portion 40 comprises a first pair of front aligned mount holes 44a, 44b which are also generally aligned with and below the socket 42. The holes 44a, 44b receive a clevis pin, pivot pin, or axle 46 or the like to pivotally couple or connect the upper mount 24 to the medial outer arm 32.

The front portion 40 further comprises a second pair of front aligned mount holes 48a, 48b offset further toward the front of upper mount 24 from the first pair of aligned holes 44a, 44b. The holes 48a, 48b receive a clevis pin, axle or pivot pin 50 or the like to pivotally couple or connect the upper mount 24 to the medial inner arm 30.

The upper mount 24 desirably comprises a structurally strong and/or light weight material. In certain embodiments, the upper mount 24 comprises a fiber reinforced composite material such as a carbon fiber reinforced plastic or thermoplastic with, for example, a polymer matrix or resin. In modified embodiments, the upper mount 24 can comprise other suitable composites, plastics, thermoplastics, metals, alloys, ceramics, among others, with efficacy, as needed or desired.

Figure 5:
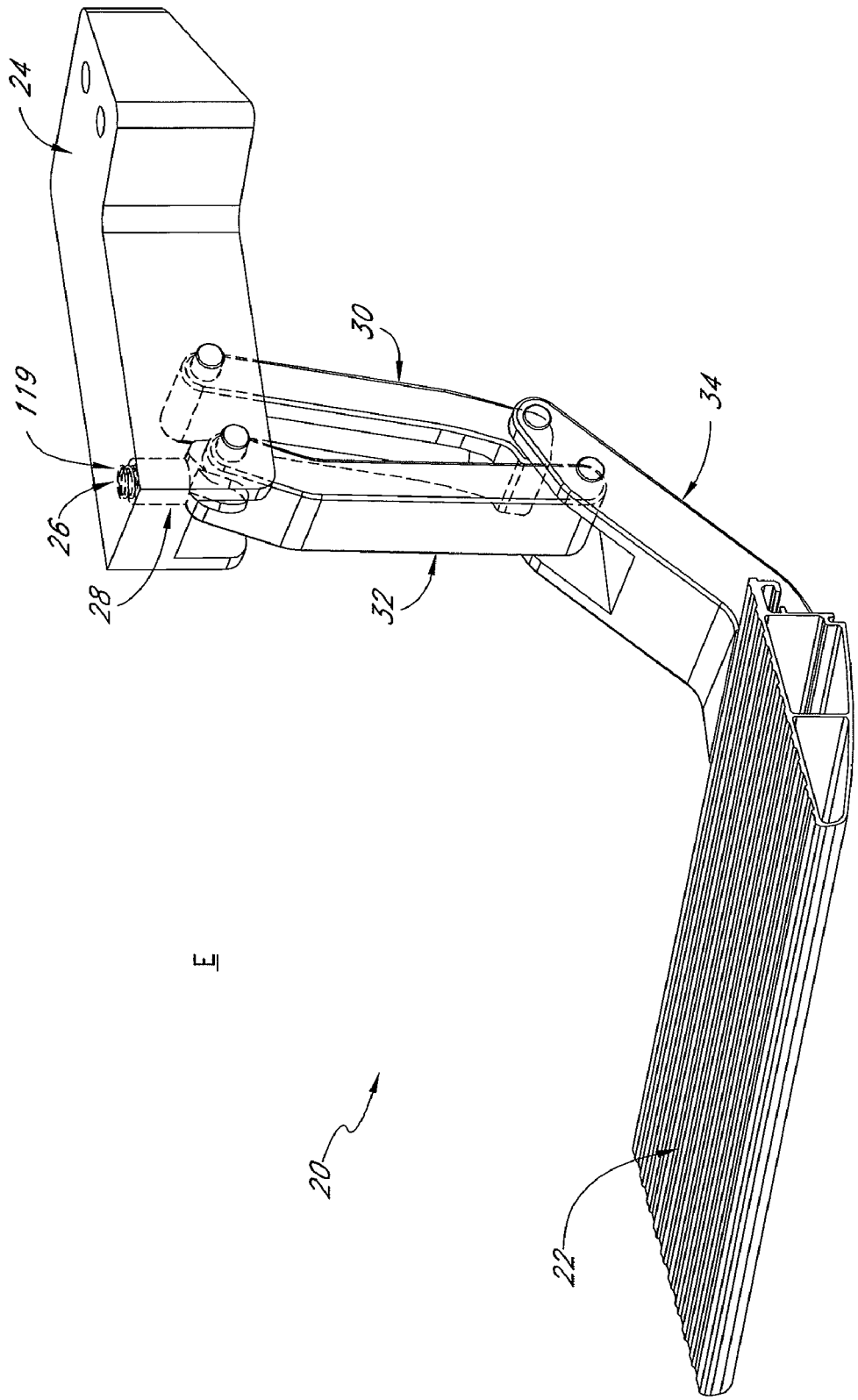
FIG. 5 is a simplified perspective of the retractable vehicle step of FIG. 4 in an extended state illustrating features and advantages in accordance with some embodiments of the invention.

In certain embodiments, as shown for example in FIG. 5 and in greater detail in FIG. 6, the biasing member 26, which is part of an internal biasing mechanism or system 119 to provide for controlled energy storage and release, comprises an internal spring. The spring 26, in certain embodiments, is a compression spring with an upper or top portion or end 52 which is received within the socket 42 and a lower or bottom portion or end 54 which is received within the plunger 28. Advantageously, the compression spring 26 provides a compact component which is durable and desirably has a high fatigue life. In modified embodiments, the biasing spring 26 can comprise other resilient energy storage and release means such as an arched or leaf spring or a V-shaped or angled spring with efficacy, as needed or desired.

Advantageously, in certain embodiments, the internal biasing spring 26 is covered and/or protected (i.e., not exposed to the ambient environment) by the socket 42 and the plunger 28. This desirably prevents or mitigates breakage, failure, malfunction and/or fouling of the internal biasing spring 26, especially when the vehicle 10 is operated in rough terrains such as during off road operation, and provides a durable and long-lasting vehicle step 20.

The biasing spring 26 desirably comprises a structurally strong and/or light weight material. In certain embodiments, the spring 26 comprises a metal or alloy such as stainless steel or aluminum. In modified embodiments, the spring 26 can comprise other suitable metals, alloys, composites, plastics, thermoplastics, ceramics, among others, with efficacy, as needed or desired.

Continuing to refer to FIG. 6, in certain embodiments, the plunger or piston 28 is moveable in a direction generally aligned with or parallel to the vertical axis 14 to provide an internal biasing mechanism that, along with the spring 26, controls the retraction and extension of the vehicle step 20. The upper portion 52 of the spring 26 extends into the socket 42. An opening or cavity 58 of the plunger receives the spring 26 with the lower spring end 54 in contact with a surface 60 of the plunger cavity 58. The spring 26 extends out of the open upper end 56 of the plunger 28.

The plunger or piston 28 comprises a lower or bottom surface 62 which forms a retaining or bearing surface that, as described in further detail below, desirably engages a specially contoured cam portion or surface 82 of the medial outer arm 32. Advantageously, in certain embodiments, the combination of the plunger retaining surface 62, the spring 26 and the contoured cam portion or surface 82 of the medial outer arm 32 provides an internal and protected biasing mechanism or system that urges the vehicle step 20 towards the retracted and extended positions while facilitating transition between the retracted and extended positions. Moreover, as noted above and discussed further below, these embodiments of the internal biasing mechanism prevent or mitigate breakage, fracture, malfunction, and/or fouling, especially in off road terrains and the like.

The plunger 28 desirably comprises a structurally strong and/or light weight material. In certain embodiments, the plunger 28 comprises a metal or alloy such as stainless steel or aluminum. In modified embodiments, the plunger 28 can comprise other suitable metals, alloys, composites, plastics, thermoplastics, ceramics, among others, with efficacy, as needed or desired.

The medial inner first arm 30 is pivotally coupled or connected to and positioned between the upper mount 24 and the lower mount 34. The medial inner arm 30 comprises an upper or top through hole or passage 64 aligned with the second pair of upper aligned mount holes 48a, 48b which receive the clevis pin, axle, or pivot pin 50 or the like. The medial inner arm 30 further comprises a lower or bottom through hole or passage 66 aligned with a second pair of lower aligned mount holes 84a, 84b which receive a clevis pin, axle or pivot pin 68 or the like to pivotally couple or connect the medial inner arm 30 and the lower mount 34.

In certain embodiments, the medial inner first arm 30 comprises a slot or through hole 70. This is advantageously configured to reduce device weight while maintaining structural integrity and overall strength.

The medial inner first arm 30, in certain embodiments, further comprises a mechanical stop, protrusion, lip or extension 72 proximate the passage 66. The mechanical stop 72 advantageously controls the maximum extension (generally position "E") by contacting or abutting the medial outer arm 32. In certain embodiments, the final retraction (generally position "R") is controlled when the inner surfaces of both medial arms 30, 32 contact or abut at the step retracted position to stop further retraction.

The medial inner arm 30 desirably comprises a structurally strong and/or light weight material. In certain embodiments, the medial inner arm 30 comprises a fiber reinforced composite material such as a carbon fiber reinforced plastic or thermoplastic with, for example, a polymer matrix or resin. In modified embodiments, the medial arm 30 can comprise other suitable composites, plastics, thermoplastics, metals, alloys, ceramics, among others, with efficacy, as needed or desired.

The medial outer second arm 32 is pivotally coupled or connected to and positioned between the upper mount 24 and the lower mount 34. The medial outer arm 32 comprises an upper or top through hole or passage 74 aligned with the first pair of upper aligned mount holes 44a, 44b which receive the clevis pin, pivot pin or axle 46 or the like. The medial outer arm 32 further comprises a lower or bottom through hole or passage 76 aligned with a first pair of lower aligned mount holes 86a, 86b which receive a clevis pin, axle or pivot pin 78 or the like to pivotally couple or connect the medial outer arm 32 and the lower mount 34.

In certain embodiments, the medial outer second arm 32 comprises a slot or through hole 80. This is advantageously configured to reduce device weight while maintaining structural integrity and overall strength.

The medial outer arm 32, in certain embodiments, comprises a specially contoured cam portion or surface 82 adjacent the passage 74. As discussed in further detail below in connection with FIGS. 6-9, the cam portion or surface 82 desirably abuts the plunger retaining surface 62 and desirably provides a biasing force to the stepping member 22 in the retracted and extended positions and facilitates transition between the retracted and extended positions The medial outer arm 32 desirably comprises a structurally strong and/or light weight material. In certain embodiments, the medial outer arm 32 comprises a fiber reinforced composite material such as a carbon fiber reinforced plastic or thermoplastic with, for example, a polymer matrix or resin. In modified embodiments, the medial arm 32 can comprise other suitable composites, plastics, thermoplastics, metals, alloys, ceramics, among others, with efficacy, as needed or desired.

In certain embodiments, the lower mount 34 is angular or generally L-shaped. The lower mount 34 generally comprises a front portion or end 35 and a back portion or end 37 and is positioned between the medial arms 30, 32 and the stepping member 22. The front portion 35 of the lower mount 34 is pivotally coupled or connected to the medial arms 30, 32 and the back portion 37 of the lower mount 34 is substantially rigidly coupled or connected to the stepping member 22.

The lower mount 34 comprises a second pair of top or upper spaced and aligned holes 84a, 84b which are aligned with the lower passage 66 of the inner arm 30 and receive the clevis or pivot pin 68 to pivotally couple or connect the lower mount 34 and the inner arm 30. The lower mount 34 further comprises a first pair of top or upper spaced and aligned holes 86a, 86b which are displaced toward the front relative to the holes 84a, 84b. The holes 86a, 86b are aligned with the lower passage 76 of the outer arm 32 and receive the clevis or pivot pin 78 to pivotally couple or connect the lower mount 34 and the outer arm 32. Clearance space 88 is desirably provided to receive lower portions of the inner and outer arms 30, 32.

In certain embodiments, the lower mount 34 comprises one or more slots or through holes 90 (see, e.g., FIG. 4). These are advantageously configured to reduce device weight while maintaining structural integrity and overall strength.

The lower mount 34, in certain embodiments, proximate its distal end comprises a slot 92 generally aligned with a pair of passages or through holes 94a, 94b. As discussed below, the slot 92 is configured to facilitate connection to the stepping member 22. Screws 96a, 96b or the like extend through respective holes 94a, 94b to desirably rigidly connect the distal mount 34 and the stepping member 22.

As shown for example in FIG. 6, in some embodiments, the front end 35 of the lower mount 34 further includes an angled portion 39. In some embodiments, the lateral displacement $d_{lateral}$ of the stepping member 22 as it moves from the retracted position R to the extended position E may be accomplished by attaching the vehicle step 20 to the vehicle 10 at an angle to the longitudinal axis 13 of the vehicle 10. The angle of attachment may be changed to conveniently increase or decrease the amount of lateral displacement $d_{lateral}$. Angled portion 39 of the lower mount 34 may be provided such that the outermost edge of stepping member 22 extends substantially parallel to the bumper 16 of the vehicle 10 in the extended position E. In the illustrated embodiment, the stepping member extends to the left of the tailgate 15 (see, e.g., FIG. 3) in the extend position E. In some embodiments, the vehicle step 20 may be configured such that it extends to the right of the tailgate 15. The angled portion 39 may be appropriately configured to position the outer edge of the stepping member 22 in a substantially parallel arrangement to the bumper 16. Alternatively, the angled portion 39 may be configured such that the outer edge of the stepping member 22 extends substantially perpendicular to the bumper 16 to, for example, facilitate entrance into or exit from the cargo bed via the side of the tailgate 15 when it is open. In some embodiments, the vehicle step 20 is arranged on the vehicle 10 such that the outer edge of the stepping member 22 is angled with respect to the lateral axis 12 of the vehicle 10 to the same degree in both the retracted and extended position. In some embodiments, this angle is between approximately 0 and 10, 0 and 20, or 0 and 45 degrees from the lateral axis 12.

The lower mount 34 desirably comprises a structurally strong and/or light weight material. In certain embodiments, the lower mount 34 comprises a fiber reinforced composite material such as a carbon fiber reinforced plastic or thermoplastic with, for example, a polymer matrix or resin. In modified embodiments, the lower mount 34 can comprise other suitable composites, plastics, thermoplastics, metals, alloys, ceramics, among others, with efficacy, as needed or desired.

The stepping member or T-nut step extrusion 22 desirably comprises a stepping deck 98. In certain embodiments, the stepping deck 98 comprises a ridged surface with ridges and valleys to provide stepping traction. In modified embodiments, the stepping deck 98 can efficaciously comprise other ridged or textured surfaces such corrugated, grooved, ribbed, dimpled, and the like, among others, as needed or desired. Various surface coatings, finishes or the like may be used with efficacy to provide enhanced traction, as needed or desired.

In certain embodiments, the stepping member 22 is substantially hollow to desirably provide a light weight component while maintaining structural integrity. In some embodiments, the stepping member 22 has a generally V-shaped configuration and comprises one or more support ribs 102 or the like.

As shown, for example, in FIG. 6, in certain embodiments one or more sides of the stepping member 22 are covered with a side cap 104 or the like for user protection. The side cap 104 can comprise any one of suitable materials such as, but not limited to, a generally rigid plastic or the like.

The stepping member 22 is configured to connect to the lower mount 34. In certain embodiments, the stepping member 22 comprises a slot 106 adjacent the lower mount 34 which is configured to receive a T-nut 108 or the like. The screws 96a, 96b engage the T-nut 108 to substantially rigidly connect or couple the stepping member 22 and the lower mount 34.

The stepping member 22 desirably comprises a structurally strong and/or light weight material. In certain embodiments, stepping member 22 comprises a metal or alloy such as aluminum or steel. In modified embodiments, the stepping member 22 can comprise other suitable metals, alloys, composites, plastics, thermoplastics, ceramics, among others, with efficacy, as needed or desired.

In some embodiments, the stepping member 22 (and/or the stepping deck 98) has a width (as measured generally along the direction of the lateral axis 12) of about 30.5 cm (12 inches) and a length (as measured generally along the direction of the longitudinal axis 13) of about 15.2 cm (6 inches). In modified embodiments, the stepping member 22 (and/or the stepping deck 98) may be dimensioned in other manners with efficacy, as needed or desired. For example, the stepping member 22 may have a width of at least 4 inches, at least 6 inches, at least 8 inches, or at least 10 inches. Similarly, the stepping member 22 may have a depth (as measured generally along the direction of the vertical axis 14) of at least 2 inches, at least 3 inches, at least 4 inches, at least 5 inches, or at least 6 inches.

The pins 46, 50, 68, 78, screws 96a, 96b and the T-nut 108 desirably comprise a structurally strong and/or light weight materials. In certain embodiments, a metal or alloy such as aluminum or steel is utilized. In modified embodiments, other suitable metals, alloys, composites, plastics, thermoplastics, ceramics, among others, can be utilized with efficacy, as needed or desired.

The retractable vehicle step, in accordance with embodiments of the invention, and its various components can be fabricated or created using a wide variety of manufacturing methods, techniques and procedures. These include, but are not limited to, casting, molding, machining, laser processing, milling, stamping, laminating, bonding, welding, adhesively fixing, and the like, among others.

Figure 7:
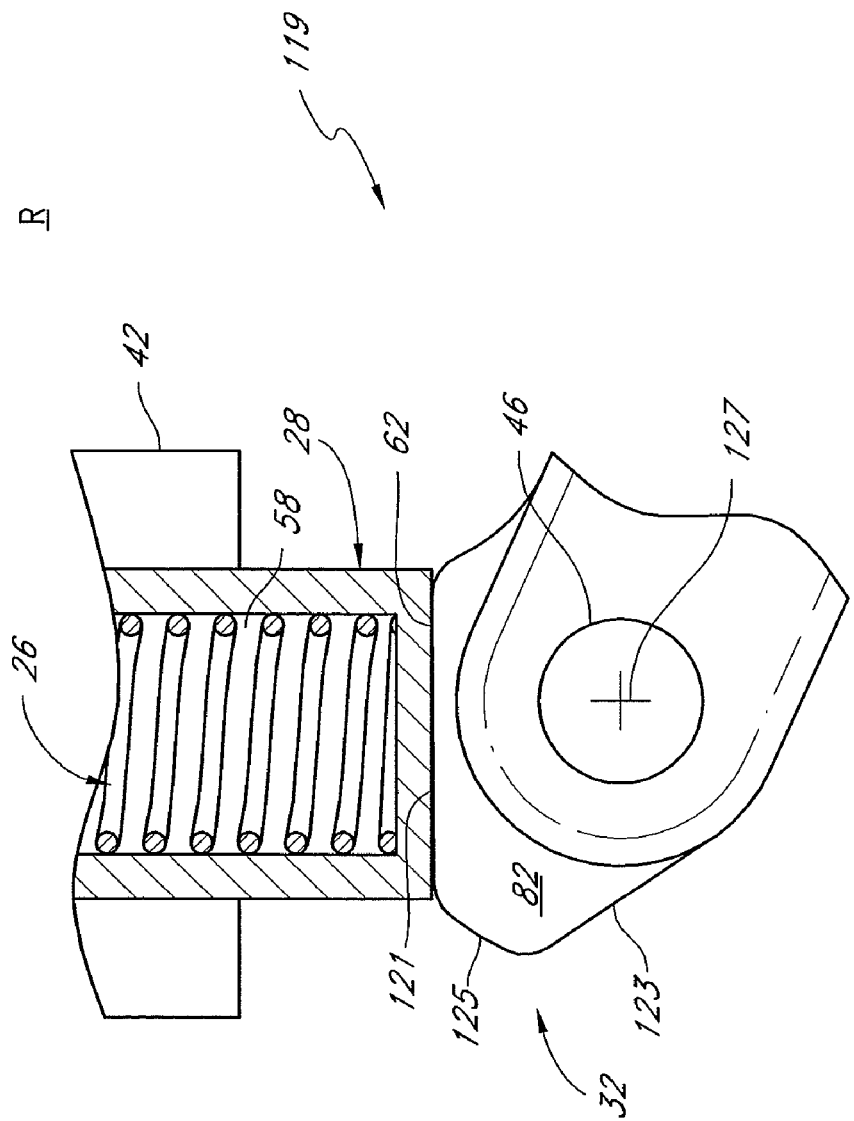
FIG. 7 is a partial sectional view of the retractable vehicle step in a retracted or storage state illustrating features and advantages in accordance with some embodiments of the invention.
Figure 8:
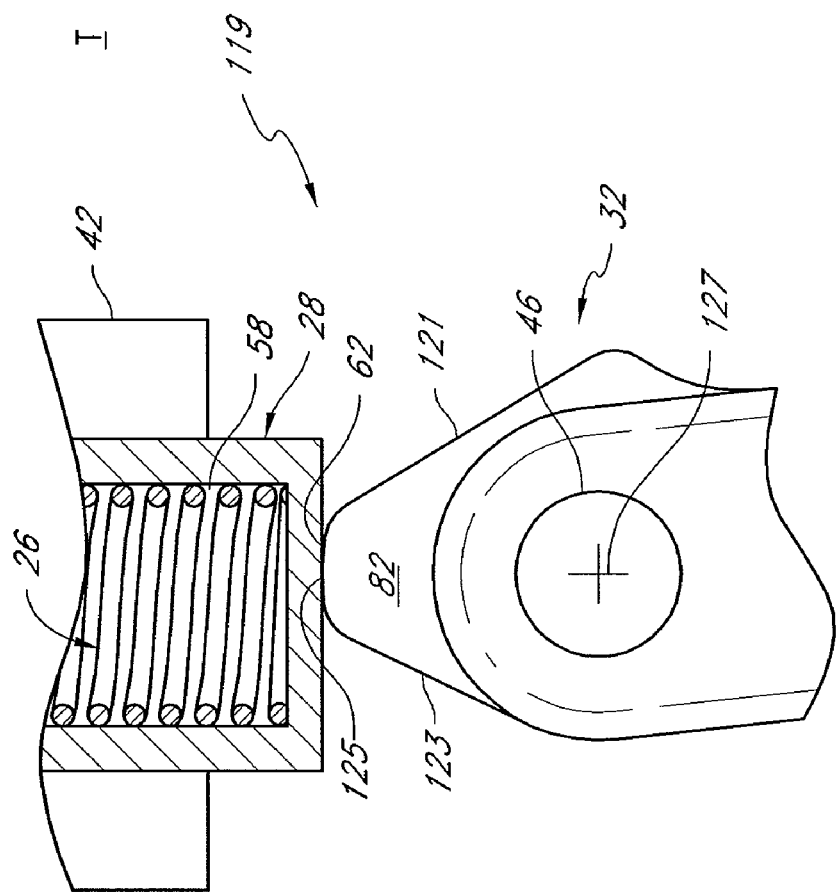
FIG. 8 is a partial sectional view of the retractable vehicle step in a transition state illustrating features and advantages in accordance with some embodiments of the invention.
Figure 9:
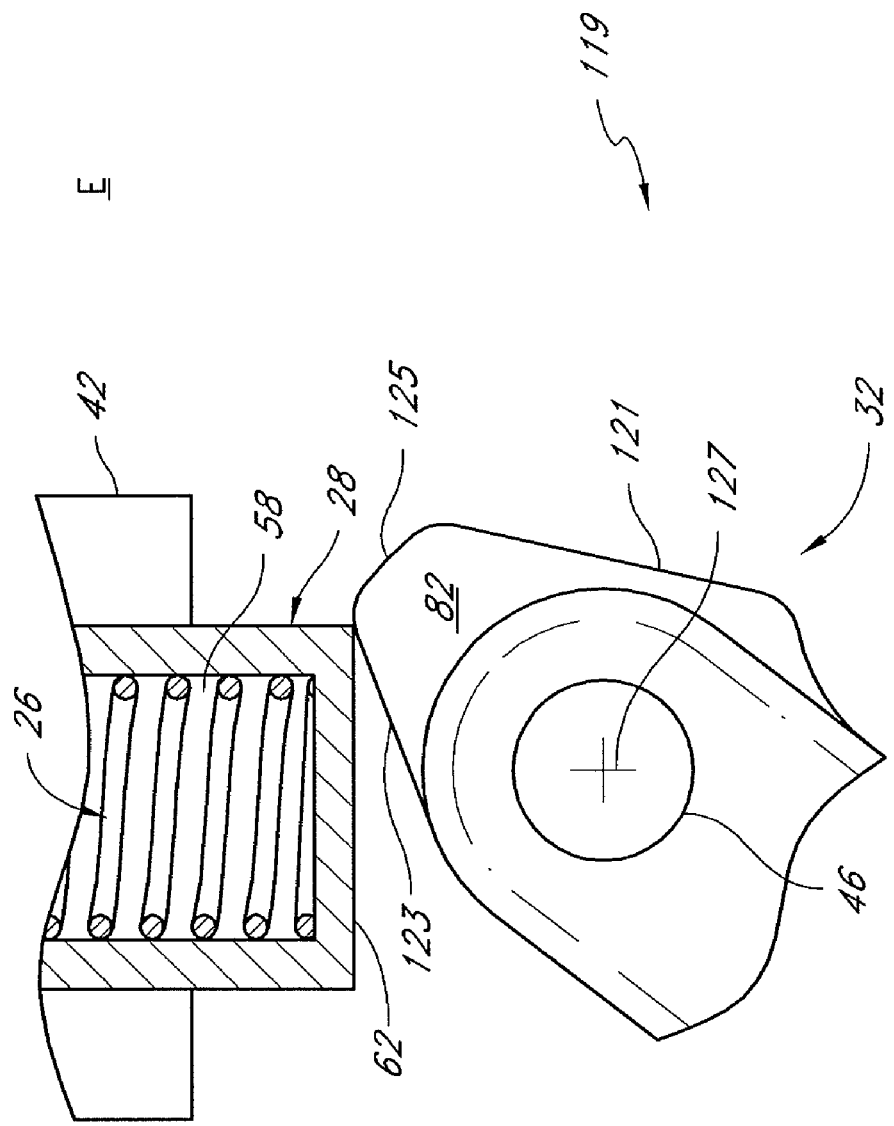
FIG. 9 is a partial sectional view of the retractable vehicle step in an extended state illustrating features and advantages in accordance with some embodiments of the invention.

FIGS. 7-9 illustrate certain embodiments of the operation of a biasing or urging mechanism 119 generally including the compression spring 26, the plunger 28 and the contoured cam portion 82 of the outer arm 32. FIG. 7 depicts the step retracted position or state "R," FIG. 8 depicts a step transition position or state "T," and FIG. 9 depicts the step extended position or state "E." The step transition position or state "T" is a position as the step member 22 transitions between the retracted and extended positions.

The outer arm contoured cam portion 82 comprises a first cam surface or portion 121, a second cam surface or portion 123, and an intermediate cam surface or portion 125. An axis of rotation or rotation or pivot axis 127 is generally defined by the pin or axle 46.

Referring in particular to FIG. 7, in the step retracted position, the moveable plunger retaining surface 62 abuts or contacts the moveable first cam surface 121 and these two surfaces are in substantially flush engagement. In the step retracted position, the plunger 28 has a generally maximum extension out of the socket 42 and the spring 26 has a generally maximum tension force to provide a biasing or urging force towards the rotation axis 127. In other words, the retaining surface 62 is biased towards the rotation axis 127 to maintain the vehicle step 20 (and/or the stepping member 22 and/or the stepping deck 98) in the retracted position, but desirably without locking out the step in the retracted position.

Referring in particular to FIG. 8, in the step transition position or stage, the moveable plunger retaining surface 62 abuts or contacts the moveable intermediate surface 125 and these two surfaces are in substantially flush engagement. In the step transition position, the plunger 28 has a generally minimum extension out of the socket 42 and the spring 26 has a generally minimum tension (or maximum compression) force. In other words, though the retaining surface 62 is biased in the direction of the rotation axis 127, the spring compression force facilitates in the transition between the retracted and extended positions.

Referring in particular to FIG. 9, in the step extended position, the moveable plunger retaining surface 62 abuts or contacts the moveable second cam surface 123 and these two surfaces are not in substantially flush engagement. In the step extended position, the plunger 28 has a generally intermediate extension out of the socket 42 and the spring 26 has a generally intermediate tension force to provide a biasing or urging force towards the rotation axis 127. In other words, the retaining surface 62 is biased towards the rotation axis 127 to maintain the vehicle step 20 (and/or the stepping member 22 and/or the stepping deck 98) in the extended position, but desirably without locking out the step in the extended position.

Stated differently, the tensioned spring 26 provides an urging or biasing force in the retracted and extended positions to maintain the vehicle step 20 (and/or the stepping member 22 and/or the stepping deck 98) in the respective retracted and extended positions, while in the transition position the compressed spring 26 facilitates in the transition between the retracted and extended positions.

As noted above, in certain embodiments, the final retraction ("R") is controlled when the inner surfaces of both medial arms 30, 32 contact or abut at the step retracted position to stop further retraction. Also as noted above, the medial inner arm stop 66 advantageously, in certain embodiments, controls the maximum extension ("E") by contacting or abutting the medial outer arm 32.

The methods which are described and illustrated herein are not limited to the sequence of acts described, nor are they necessarily limited to the practice of all of the acts set forth. Other sequences of acts, or less than all of the acts, or simultaneous occurrence of the acts, may be utilized in practicing embodiments of the invention.

Figure 10:
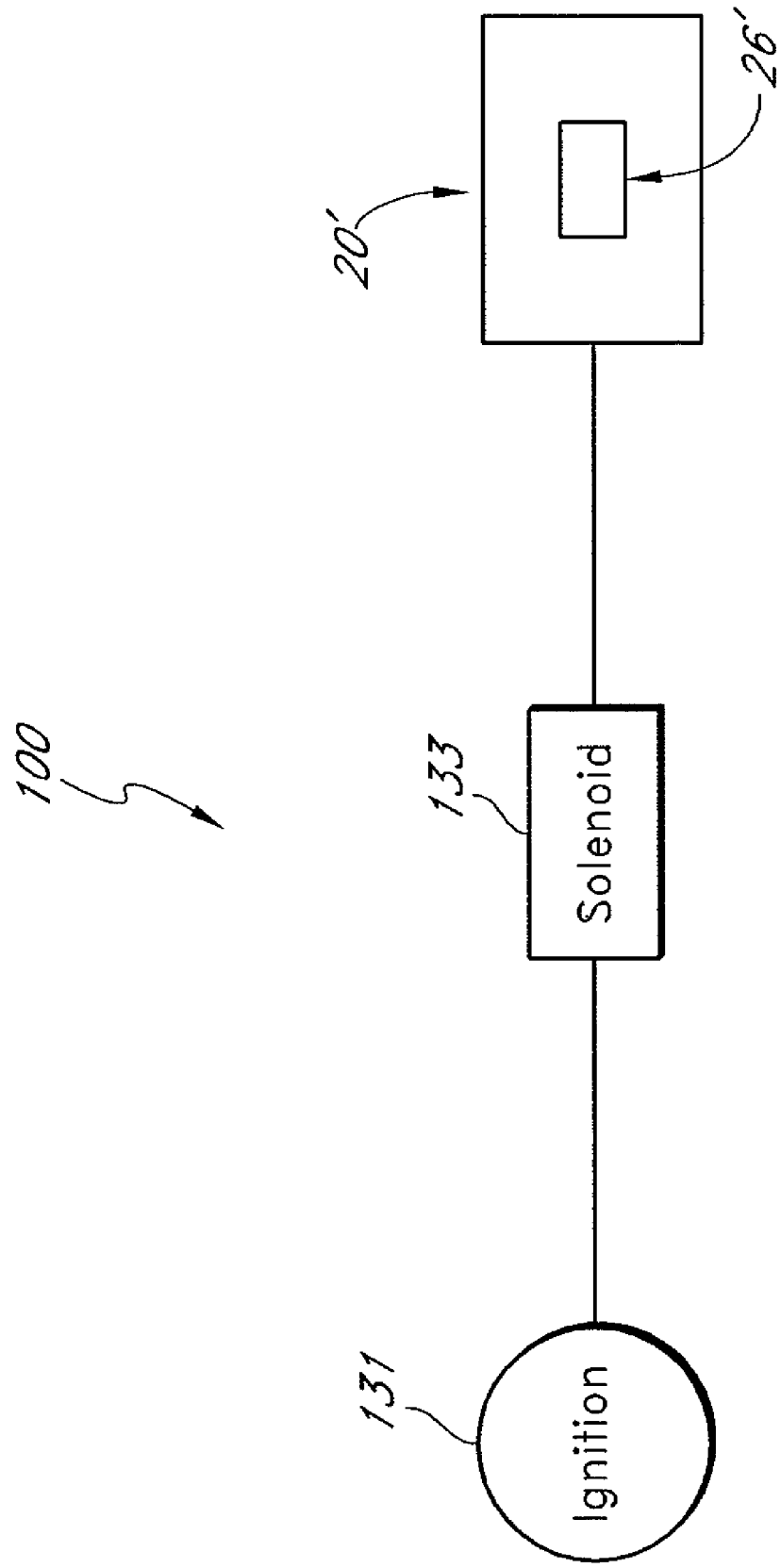
FIG. 10 is a simplified schematic view of a powered retractable vehicle step system illustrating features and advantages in accordance with some other embodiments of the invention.

FIG. 10 schematically shows a powered retractable vehicle step system 100 in accordance with some embodiments. The system 100 comprises a retractable vehicle step 20' which is substantially the same as embodiments of the vehicle step 20 except that it has a biasing member that comprises an electronically operable gas spring 26'.

In certain embodiments, when the vehicle 10 is turned on by its ignition 131, the ignition 131 actuates a solenoid actuator, motor or device 133 to retract the vehicle step 20' by operation of the gas spring 26'. This is convenient, for example, if the user forgets to retract the vehicle step 20' after use, the ignition 131 automatically retracts the vehicle step 20', thereby desirably protecting it from potential damage.

Figure 11:
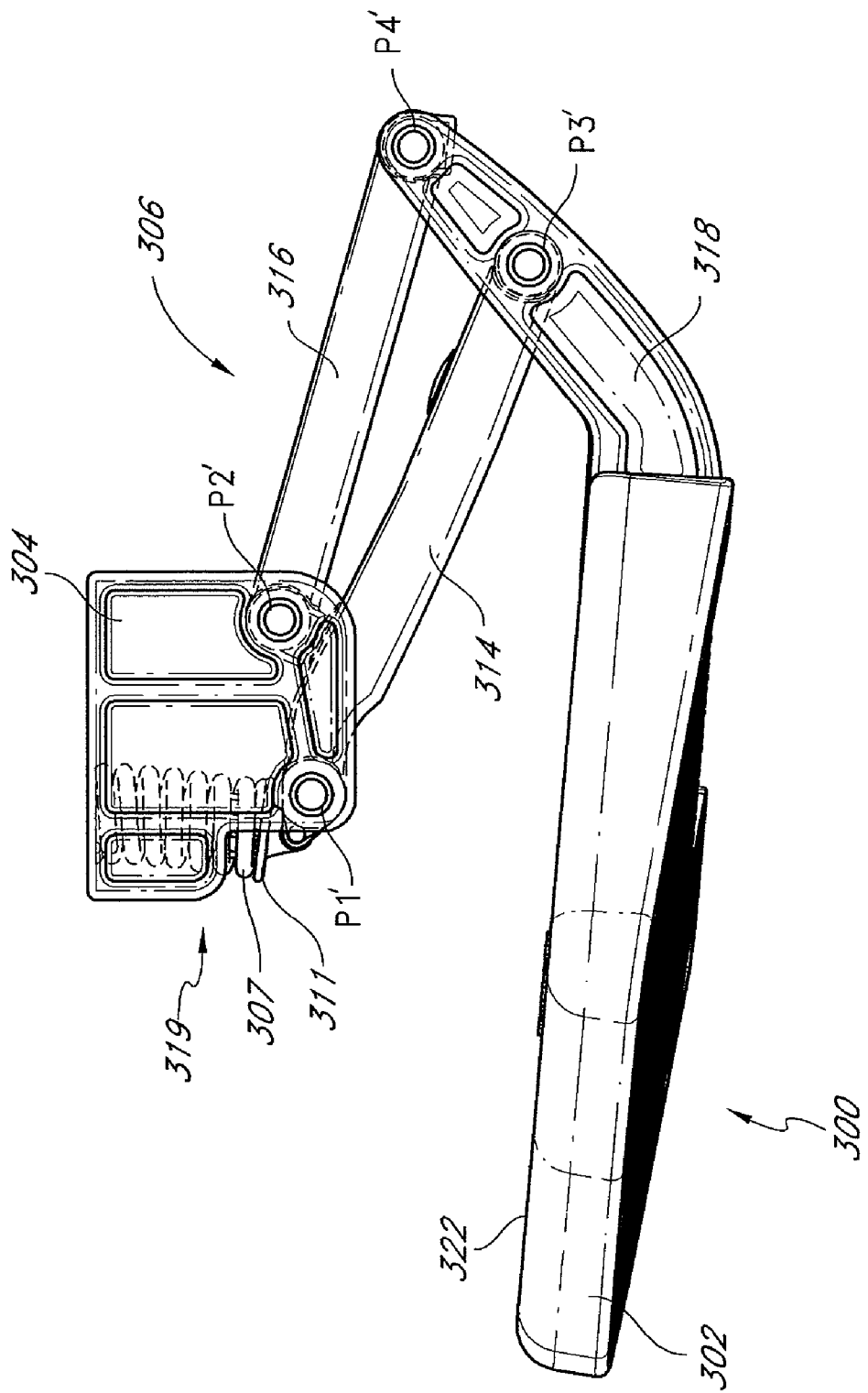
FIG. 11 is a side view of another embodiment of a retractable vehicle step in a retracted position.
Figure 12:
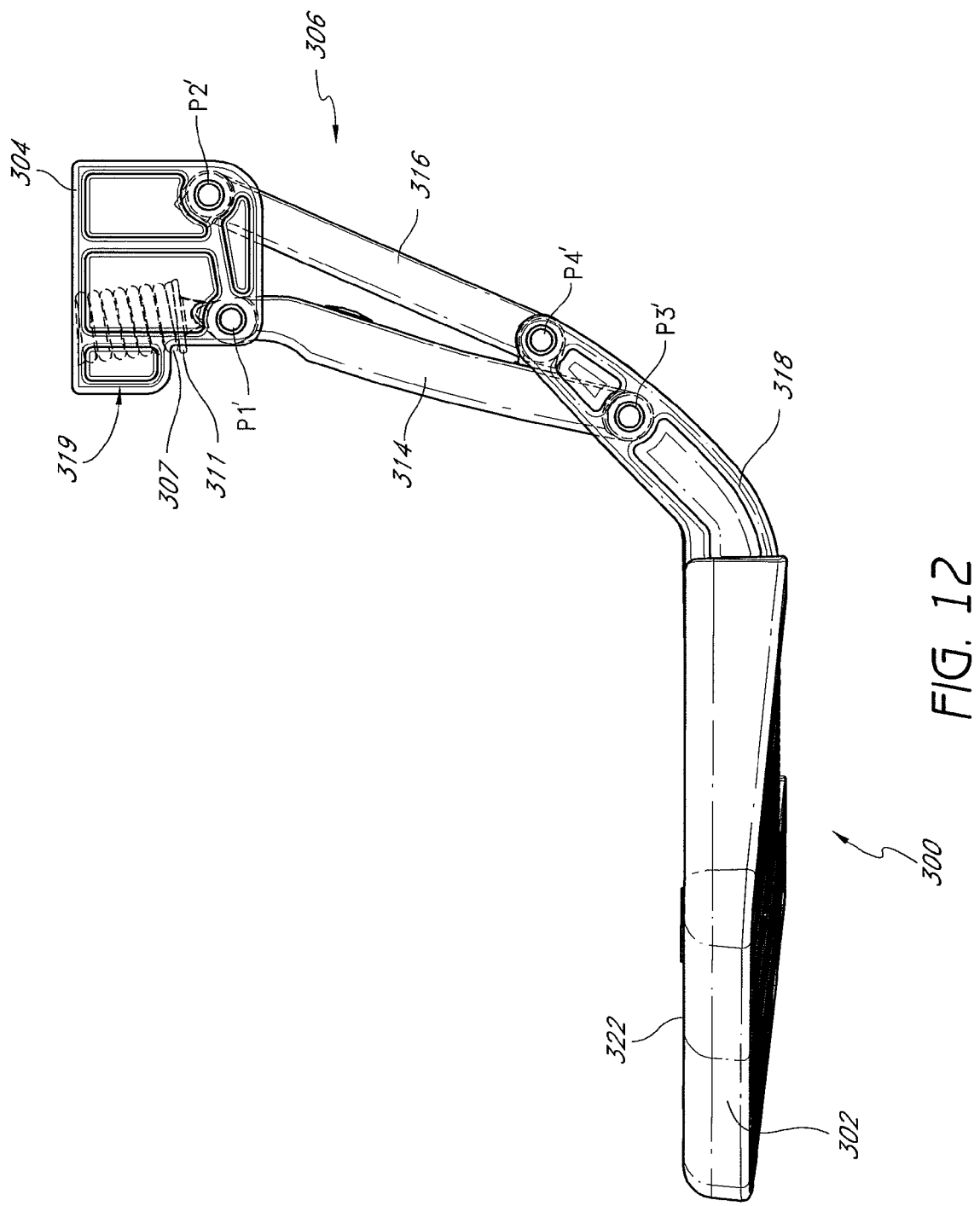
FIG. 12 is a side view of the retractable vehicle step of FIG. 11 in an extended position.

With reference to FIGS. 11 and 12 another embodiment of a retractable vehicle step is illustrated. The retractable vehicle step 300 is configured to be mounted to a vehicle (not shown). The retractable vehicle step 300 is further configured to have a first position and a second position. The first position comprises the vehicle step 300 in a retracted position and the second position comprises the vehicle step 300 to be in an extended position. In the retracted position, the retractable vehicle step 300 is preferably located in a substantially inboard position relative to the rear of a vehicle and, in the extended position, the retractable vehicle step 300 is in a substantially outboard position relative to the rear of a vehicle.

In some embodiments, the retractable vehicle step 300 preferably includes an upper mount 304, a stepping member 302 and connecting arms 306. Furthermore, the retractable vehicle step 300 preferably includes a biasing mechanism 319 including a biasing member 307, which in some embodiments may be substantially similar to the biasing member 26 of the embodiment of the retractable vehicle step 20 shown in FIG. 4.

The upper mount 304 may include one or more additional mounting portions (not shown) to facilitate securing the vehicle step 300 to a vehicle. In the particular embodiment of the retractable vehicle step 300 shown in FIGS. 11 and 12, the upper mount 304 is preferably a U-shaped mount which comprises pivotal connections P1' and P2'. The pivotal connections P1' and P2' are preferably configured to pivotally connect the arms 306 to the upper mount 304. The upper mount 304 in some embodiments may further include certain electronic or mechanic actuation components which may be configured to actuate the retraction or extension of the retractable vehicle step 300. Such components may be substantially similar to those described above with reference to previous embodiments of a retractable vehicle step.

With continued reference to FIGS. 11 and 12, the retractable vehicle step 300 further includes arms 306. The arms 306 further include a first arm 314 and a second arm 316. The arm 314 is preferably secured by pivotal connection P1' to the upper mount 304 and is secured to a step bracket 318 at pivotal mount P3'. The arm 316 is preferably secured to the upper mount 304 at pivotal mount P2' and is secured to the step bracket 318 at pivotal connection P4'. The lengths and mounting positions of the connecting arms 306 are preferably sized and shaped so as to move the stepping member 302 downwards and outboard when the retractable vehicle step 300 is moved from a retracted position to an extended position.

Figure 11A:
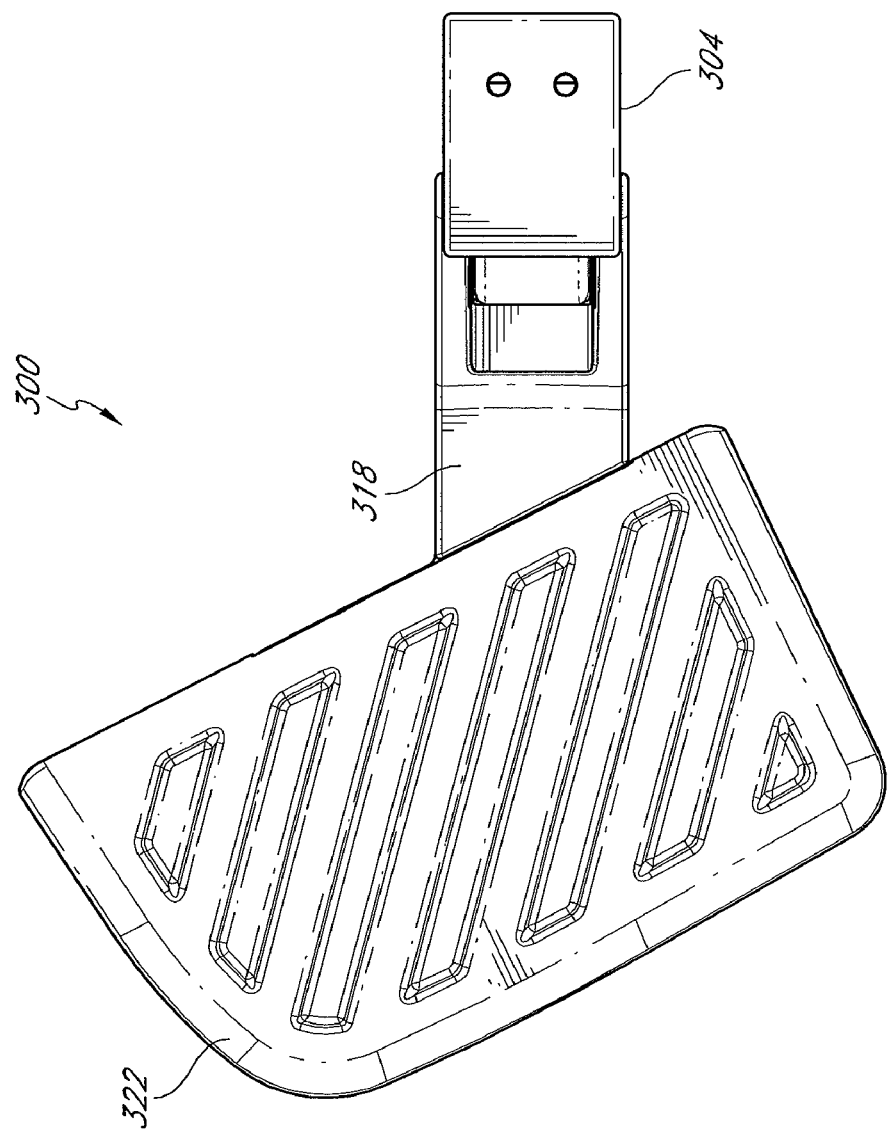
FIG. 11A is a top view of the retractable vehicle step of FIG. 11.

In some embodiments, it is advantageous to configure the vehicle step 300 such that in the retracted position, the stepping surface 322 of the stepping member 302 is at an angle to the horizontal. As shown in FIG. 11A, the stepping member 302 need not be symmetrical. In some embodiments, the outer edge corner of the stepping member 302 may be rounded or otherwise shaped to minimize the amount of stepping member 302 that extends beyond the bumper if the vehicle step 300 is mounted in close proximity to the outer edge of the bumper of the vehicle. In some embodiments, the outer corner of the stepping member 302 is shaped to correspond to the rounded features of the bumper to present an aesthetically pleasing appearance when mounted and in the retracted position.

With continued reference to FIGS. 11 and 12, the step bracket 318 is preferably connected to the arms 306 at pivotal mount P4' and pivotal mount P3'. The step bracket 318 is further configured to receive a stepping member 302. The stepping member 302 and the step bracket 318 in some embodiments may be secured to one another by fasteners so as to create a connection that may support the weight of a person stepping on the retractable vehicle step 300. In addition, it may be operated by the foot or other appendage of a user as described in greater detail below.

Though not shown, when mounted on the rear of a vehicle, it may be advantageous in some embodiments to mount the vehicle step 300 such that the stepping member 302 is displaced laterally a distance $d_{lateral}$ to provide clearance for, for example, an open tailgate. In some embodiments, this may be accomplished as described above with respect to vehicle step 20. FIG. 11A shows the vehicle step 300 from a top view, illustrating an angle formed between the arms 306 and the stepping member 302 according to some embodiments. As the stepping member 302 moves from the retracted to the extended positions, the angle between the arms 306 and the stepping member 302 preferable remains constant. In some embodiments, the stepping member 302 is positioned on the vehicle such that the outer edge of the stepping member 302 is substantially parallel to the bumper of the vehicle in both the retracted and extended positions. As described above with respect to the other embodiments, the stepping member 302 may alternatively be at an angle to the bumper of the vehicle.

In some embodiments, the retractable vehicle step is advantageously configured to permit manually operated retraction and extension. Manual operation may minimize the expense of manufacture and/or installation. In some embodiments, the retractable step is particularly configured to be moved between its retracted and extended positions by foot operation of a user. Advantageously, the vehicle step includes a mechanism to facilitate this operation. For example, in the embodiment shown in FIGS. 11 and 12, the vehicle step 300 includes biasing member 307, for example a spring. In the retracted position, shown in FIG. 11, biasing member 307 biases the stepping member 302 in the retracted position. The biasing member 307 compresses as the stepping member 302 is pulled outwards toward the extended position, thereby providing resistance to the movement outwards. As the stepping member 302 continues to move outwards, the biasing member 307 passes its inflection point and begins to expand rather than compress. The expansion of the biasing member 307 assists the continued extension of the stepping member 302. In the extended position, the vehicle step 300 may be self-energized or locked to prevent accidental retraction when weight is applied to the extended step, e.g., when a person steps on the stepping member 302 the vehicle step does not load in such a way to bias the vehicle step 300 in a retracted position. Described in another way, by stepping on the stepping member 302 the vehicle step will be substantially locked by the arms 306 so as to bias the vehicle step 300 to an open position. Self-energized features may be provided on any of the vehicle steps described herein.

To return a self-energized step to the retracted position, the stepping member 302 is partially lifted when in the extended position and pushed toward the vehicle and into the retracted position. The biasing member 307 again resists this movement inwards, for example, by compressing as the stepping member 302 moves inwards. If the vehicle step 300 is not self-energized, step may be moved toward the retracted position simply by pushing the step toward the retracted position. The resistance of the biasing member 307 to this movement helps resist unintended movement of the step 300 toward the retracted position when in use.

When the biasing member 307 passes its inflection point, it assists in the movement inwards and biases the stepping member 302 into the retracted position. In some embodiments, the biasing forces of the biasing member 307 are advantageously configured to allow the vehicle step 300 to be retracted and extended by the foot of a user, rather than a hand operated handle or lever or an automated system. In some embodiments, the vehicle step 300 is moved to the extended position by a user who hooks her foot onto the stepping member 302 and pulls it outwards toward the extended position. In some embodiments, an engagement portion may be provided on the step to facilitate the hooking of the foot. For example, a cavity on the underside of the step may be provided.

In some embodiments, biasing member or spring 307 engages a lower portion of upper mount 304 and is held in place at least at the end engaging the upper mount 304. For example, the spring 307 may rest in a cavity formed in upper mount 304 such that an upper portion of spring 307 is enclosed within the cavity and a lower portion of the spring 307 is outside of the cavity. The upper portion of the spring 307 is substantially prevented from moving along the X and Y directions as the stepping member 302 is moved from the retracted to the extended positions. The lower portion of the spring 307 outside of the cavity is not directly restrained by the cavity and is thereby allowed to move along the X and Y directions as the stepping member 302 moves from the retracted position to the extended portion. The lower portion of the sprint 302 may engage a spring mount 311 to facilitate attachment to the arms 306 and to permit movement of the lower portion of the spring 307 with respect to the upper portion of the spring 307 and the arms 306. In some embodiments, the cavity encloses the entire spring 307 with an uppermost portion configured to restrain an upper portion of the spring 307 from moving while a lower portion of the cavity allows movement of a lower portion of the spring 307. In some embodiments, some or all of the spring 307 may be engaged with a cylinder extending downward from a lower portion of the upper mount 304. The cylinder may function in a similar manner as the cavity described above, preventing a portion of the spring 307 from moving in the X and Y directions while allowing another portion to move in those directions as the stepping member 302 is moved from the retracted to the extended positions.

Accordingly, it will be appreciated that there is disclosed a retractable step or step assist designed to be mounted to a vehicle. The step assist desirably includes a first support arm, a second support arm and a step member. The step member desirably includes an upper stepping surface defining a support plane, the first support arm and the second support arm connected to the step member so that the first support arm and the second support arm are pivotable with respect to the step member about a third axis and a fourth axis, respectively. The first support arm and the second support arm allow the step member to move between a retracted position and a deployed position outward from the retracted position.

In some embodiments, when the step member is in the deployed position, the arms and step member act to self-energize the step assist. In some embodiments, the step assist is not self-energized when in the retracted position, but may be held in place by a biasing member or cam assembly.

In some embodiments, the step member is angled with respect to the horizontal when in a retracted position. In some embodiments, the step member is angled downward in an outboard direction when the step assist is in a retracted position. In some embodiments, the outboard end of the stepping surface may be vertically spaced no more than approximately ½ inch, no more than approximately 1 inch, no more than approximately 2 inches, no more than approximately 3 inches, or no more than approximately 4 inches below the bottom edge of the vehicle bumper when the step assist is in a retracted position. In some embodiments, the bottom of the stepping member may be vertically spaced no more than approximately ½ inch, no more than approximately 1 inch, no more than approximately 2 inches, no more than approximately 3 inches, or no more than approximately 4 inches below the bumper of the vehicle when in a retracted position. In some embodiments, the top of the stepping surface may be vertically spaced at least approximately ½ inch, at least approximately 1 inch, at least approximately 2 inches, at least approximately 3 inches, or at least approximately 4 inches below the bumper of the vehicle when in a deployed position. In some embodiments, the stepping member will extend no more than approximately 12 inches, no more than approximately 8 inches, or no more than approximately 6 inches below the bumper. In some embodiments, the arms of the step assist contact each other when the step assist is in a deployed position. In some embodiments, a biasing member serves to hold the step assist in a retracted position and upon movement of the step assist from the retracted position, the biasing member helps to deploy the step assist.

Unless otherwise stated, it is to be understood that any range of values disclosed, taught or suggested herein comprises all values and sub-ranges therebetween. For example, a range from 1 to 100 will comprise all integer and non-integer numerical values between 1 and 100; and all sub-ranges between 1 and 100 including all integer and non-integer numerical values of the range limits and numbers therebetween.

From the foregoing description, it will be appreciated that a novel approach for providing and using a retractable vehicle step assist with enhanced clearance features has been disclosed. While the components, techniques and aspects of the invention have been described with a certain degree of particularity, it is manifest that many changes may be made in the specific designs, constructions and methodology herein above described without departing from the spirit and scope of this disclosure.

While a number of preferred embodiments of the invention and variations thereof have been described in detail, other modifications and methods of using, and other vehicular, automobile and/or mechanical applications for the same will be apparent to those of skill in the art. Accordingly, it should be understood that various applications, modifications, and substitutions may be made of equivalents.

Various modifications and applications of the invention may occur to those who are skilled in the art, without departing from the true spirit or scope of the invention. It should be understood that the invention is not limited to the embodiments set forth herein for purposes of exemplification.

What is claimed is:

1. A retractable vehicle step, comprising:
   a first mount having a front end and a back end;
   a second mount;
   a first arm coupled to said first mount by a first pivotal connection and
   a second arm coupled to said first mount by a second pivotal connection, said first arm coupled to said second mount by a third pivotal connection defining a first axis and said second arm coupled to said second mount by a fourth pivotal connection defining a second axis;
   a stepping member coupled to said second mount being moveable between a retracted position and a longitudinally extended position, said stepping member defining a back outer edge;
   a biasing mechanism being operably coupled to said stepping member and configured to urge said stepping member toward said retracted position and at least partially resist movement of the stepping member from said extended position toward said retracted position;
   wherein said step is securable to a vehicle defining a longitudinal axis extending from front to rear of the vehicle, said back outer edge of said stepping member forms an angle with respect to said first axis and said second axis such that said stepping member is laterally displaced by a predetermined distance equal to at least 2 inches and longitudinally displaced by a predetermined distance when transitioning between said retracted position and said extended position.

2. The vehicle step of claim 1, wherein said laterally displaced predetermined distance is about 6.4 cm (2.5 inches).

3. The vehicle step of claim 1, wherein said laterally displaced predetermined distance is in the range from 5.1 cm (2 inches) to about 7.6 cm (3 inches).

4. The vehicle step of claim 1, wherein said laterally displaced predetermined distance is at least 3 inches.

5. The vehicle step of claim 1, wherein said biasing mechanism comprises a biasing member.

6. The vehicle step of claim 5, wherein said biasing member comprises a spring.

7. The vehicle step of claim 6, wherein said spring comprises a compression spring.

8. The vehicle step of claim 6, wherein said spring is substantially covered.

9. The vehicle step of claim 1, wherein said vehicle step is mountable to a vehicle utilizing an already existing connection element of said vehicle.

10. The vehicle step of claim 9, wherein said vehicle step is mountable to a rear portion of said vehicle.

11. The vehicle step of claim 1, wherein said stepping member in said extended position provides spatial clearance relative to a tailgate of a vehicle.

12. The vehicle step of claim 1, wherein said biasing mechanism comprises a gas spring.

13. The vehicle step of claim 12, wherein said gas spring is operable by a solenoid.

14. The vehicle step of claim 13, wherein said solenoid is actuated by an ignition of a vehicle to move said stepping member from said extended position to said retracted position.

15. The vehicle step of claim 1, wherein said second mount is substantially rigidly connected to the back of said stepping member and said second mount comprises, a portion angled with respect to a lateral axis of said step.

16. The vehicle step of claim 1, wherein said biasing member is operably coupled to said second arm.

17. The vehicle step of claim 1, wherein said first and second arms cooperate to form a mechanical stop that controls the maximum extension of said vehicle step.

18. The vehicle step of claim 1, wherein said biasing mechanism further comprises a moveable retaining surface and a cam surface such that in said retracted position said cam surface contacts said retaining surface and urges said stepping member toward said retracted position.

19. The vehicle step of claim 18, wherein said biasing mechanism comprises a second cam surface such that in said extended position said second cam surface contacts said retaining surface and urges said stepping member toward said extended position.

20. The vehicle step of claim 19, wherein said biasing mechanism comprises an intermediate surface between said cam surfaces which facilitates transitioning between said retracted position and said extended position.

21. The vehicle step of claim 18, wherein said retaining surface is biased towards a rotation axis of said biasing mechanism.

22. An assembly comprising:
a vehicle defining a longitudinal axis extending from front to rear of the vehicle; and
a retractable vehicle step, comprising:
a first mount having a front end and a back end;
a second mount;
a first arm coupled to said first mount by a first pivotal connection and
a second arm coupled to said first mount by a second pivotal connection, said first arm coupled to said second mount by a third pivotal connection defining a first axis and said second arm coupled to said second mount by a fourth pivotal connection defining a second axis;
a stepping member coupled to said second mount being moveable between a retracted position and a longitudinally extended position;
a biasing mechanism being operably coupled to said stepping member and configured to urge said stepping member toward said retracted position and at least partially resist movement of the stepping member from said extended position toward said retracted position;
wherein said step is secured to said vehicle so that said first axis and said second axis form an angle with respect to said longitudinal axis of said vehicle such that said stepping member is laterally displaced by a predetermined distance equal to at least 2 inches and longitudinally displaced by a predetermined distance when transitioning between said retracted position and said extended position.

23. The assembly of claim 22, wherein said vehicle further comprises a bumper, wherein the bottom of said stepping member is vertically spaced no more than approximately 2 inches below the bumper of the vehicle when in the retracted position.

24. The assembly of claim 22, wherein said vehicle further comprises a bumper, wherein the bottom of said stepping member is vertically spaced no more than approximately 3 inches below the bumper of the vehicle when in the retracted position.

25. The assembly of claim 22, wherein said vehicle further comprises a bumper, wherein the bottom of said stepping member is vertically spaced no more than approximately 1 inch below the bumper of the vehicle when in the retracted position.

26. The assembly of claim 22, wherein said laterally displaced predetermined distance is about 6.4 cm (2.5 inches).

27. The assembly of claim 22, wherein said laterally displaced predetermined distance is in the range from 5.1 cm (2 inches) to about 7.6 cm (3 inches).

28. The assembly of claim 22, wherein said laterally displaced predetermined distance is at least 3 inches.

29. The assembly of claim 22, wherein said biasing mechanism comprises a biasing member.

30. The assembly of claim 29, wherein said biasing member comprises a spring.

31. The assembly of claim 30, wherein said spring comprises a compression spring.

32. The assembly of claim 30, wherein said spring is substantially covered.

33. The assembly of claim 22, wherein said vehicle step is mounted to a rear portion of said vehicle.

34. The assembly of claim 22, wherein said stepping member in said extended position provides spatial clearance relative to a tailgate of the vehicle.

35. The assembly of claim 22, wherein said biasing mechanism comprises a gas spring.

36. The assembly of claim 35, wherein said gas spring is operable by a solenoid.

37. The assembly of claim 36, wherein said solenoid is actuated by an ignition of the vehicle to move said stepping member from said extended position to said retracted position.

38. The assembly of claim 22, wherein said biasing member is operably coupled to said second arm.

39. The assembly of claim 22, wherein said first and second arms cooperate to form a mechanical stop that controls the maximum extension of said vehicle step.

40. The assembly of claim 22, wherein said biasing mechanism further comprises a moveable retaining surface and a cam surface such that in said retracted position said cam surface contacts said retaining surface and urges said stepping member toward said retracted position.

41. The assembly of claim 40, wherein said biasing mechanism comprises a second cam surface such that in said extended position said second cam surface contacts said retaining surface and urges said stepping member toward said extended position.

42. The assembly of claim 41, wherein said biasing mechanism comprises an intermediate surface between said cam surfaces which facilitates transitioning between said retracted position and said extended position.

43. The assembly of claim 40, wherein said retaining surface is biased towards a rotation axis of said biasing mechanism.

44. The vehicle step of claim 22, wherein said biasing mechanism comprises a second cam surface such that in said extended position said second cam surface contacts said retaining surface and urges said stepping member toward said extended position.

45. The vehicle step of claim 26, wherein said biasing mechanism comprises an intermediate surface between said cam surfaces which facilitates transitioning between said retracted position and said extended position.

46. The vehicle step of claim 26, wherein said retaining surface is biased towards a rotation axis of said biasing mechanism.

47. The vehicle step of claim 26, wherein said biasing mechanism comprises a compression spring.

48. The vehicle step of claim 29, wherein said spring is substantially covered.

* * * * *

UNITED STATES PATENT AND TRADEMARK OFFICE
CERTIFICATE OF CORRECTION

| | | |
|---|---|---|
| PATENT NO. | : 7,740,261 B2 | Page 1 of 1 |
| APPLICATION NO. | : 11/924549 | |
| DATED | : June 22, 2010 | |
| INVENTOR(S) | : Leitner et al. | |

It is certified that error appears in the above-identified patent and that said Letters Patent is hereby corrected as shown below:

On the Title page:
Item 73 Assignee at line 1, Change "89908, Inc." to --89908, Inc. dba AMP Research,--.

At column 15, line 25, please delete "comprises,", and insert --comprises--.

Signed and Sealed this
Fifteenth Day of March, 2011

David J. Kappos
*Director of the United States Patent and Trademark Office*